United States Patent
Hurwitz et al.

(10) Patent No.: US 7,765,135 B2
(45) Date of Patent: Jul. 27, 2010

(54) COUNT AND LOGIN MANAGEMENT

(75) Inventors: Harlan A. Hurwitz, River Edge, NJ (US); Stewart A. Kautsch, Rutherford, NJ (US); Brendan K. Murphy, Cedar Grove, NJ (US); Robert Pickles, Chesapeake, VA (US); Daniel M. Wobser, Jackson, NJ (US)

(73) Assignee: Talaris Holdings Limited, London (GB)

( * ) Notice: Subject to any disclaimer, the term of this patent is extended or adjusted under 35 U.S.C. 154(b) by 632 days.

(21) Appl. No.: 10/524,112

(22) PCT Filed: Sep. 5, 2003

(86) PCT No.: PCT/US03/27613

§ 371 (c)(1),
(2), (4) Date: Dec. 9, 2005

(87) PCT Pub. No.: WO2004/023252

PCT Pub. Date: Mar. 18, 2004

(65) Prior Publication Data

US 2006/0112007 A1    May 25, 2006

Related U.S. Application Data

(60) Provisional application No. 60/408,303, filed on Sep. 6, 2002, provisional application No. 60/448,484, filed on Feb. 21, 2003, provisional application No. 60/460,055, filed on Apr. 4, 2003, provisional application No. 60/460,420, filed on Apr. 7, 2003.

(51) Int. Cl.
*G06Q 40/00* (2006.01)
*G06F 7/08* (2006.01)
(52) U.S. Cl. .......................... 705/35; 235/379; 235/425
(58) Field of Classification Search .................. None
See application file for complete search history.

(56) References Cited

U.S. PATENT DOCUMENTS

| | | | |
|---|---|---|---|
| 4,310,885 A | 1/1982 | Azcua et al. | |
| 4,365,700 A | 12/1982 | Arimoto et al. | |
| 5,313,050 A | 5/1994 | Hiroki et al. | |

(Continued)

FOREIGN PATENT DOCUMENTS

EP    0 724 242 A2    7/1996

(Continued)

OTHER PUBLICATIONS

Office Action issued in U.S. Appl. No. 10/524,110; Dec. 28, 2009.

(Continued)

*Primary Examiner*—Alexander Kalinowski
*Assistant Examiner*—John D Scarito
(74) *Attorney, Agent, or Firm*—Oliff & Berridge, PLC

(57) ABSTRACT

A method of controlling a machine that accepts payment media and that requires a user login operation, the method includes receiving payment media in an input receptacle of the machine, starting processing of the payment media that has been received in the input receptacle, and performing the user login operation. The step of performing the user login operation can be done before, during and after the step of processing the payment media.

14 Claims, 13 Drawing Sheets

U.S. PATENT DOCUMENTS

| | | | |
|---|---|---|---|
| 5,368,149 A | 11/1994 | Ibarrola | |
| RE34,915 E | 4/1995 | Nichtberger et al. | |
| 5,453,601 A * | 9/1995 | Rosen | 705/43 |
| 5,550,360 A | 8/1996 | Muraoka | |
| 5,641,039 A | 6/1997 | Dumont | |
| 5,695,038 A * | 12/1997 | Keith et al. | 235/379 |
| 5,796,083 A * | 8/1998 | Kenneth et al. | 235/380 |
| 5,804,804 A | 9/1998 | Fukatsu et al. | |
| 5,892,900 A | 4/1999 | Ginter et al. | |
| 5,898,777 A | 4/1999 | Tycksen et al. | |
| 5,918,213 A | 6/1999 | Bernard et al. | |
| 5,984,178 A | 11/1999 | Gill et al. | |
| 6,006,989 A | 12/1999 | Ademmer et al. | |
| 6,014,649 A | 1/2000 | Kobayashi et al. | |
| 6,080,056 A * | 6/2000 | Karlsson | 453/3 |
| 6,081,791 A * | 6/2000 | Clark | 705/43 |
| 6,128,402 A | 10/2000 | Jones et al. | |
| 6,213,310 B1 | 4/2001 | Wennersten et al. | |
| 6,226,624 B1 | 5/2001 | Watson et al. | |
| 6,341,353 B1 | 1/2002 | Herman et al. | |
| 6,363,164 B1 | 3/2002 | Jones et al. | |
| 6,481,620 B1 * | 11/2002 | Katou et al. | 235/379 |
| 6,554,185 B1 | 4/2003 | Montross et al. | |
| 6,578,015 B1 | 6/2003 | Haseltine et al. | |
| 6,659,340 B2 * | 12/2003 | Siemens | 235/379 |
| 6,837,428 B2 | 1/2005 | Lee et al. | |
| 6,845,907 B1 | 1/2005 | Enright | |
| 7,110,954 B2 | 9/2006 | Yung et al. | |
| 7,120,365 B2 | 10/2006 | Yamazaki | |
| 2002/0011393 A1 | 1/2002 | Siemens | |
| 2002/0030101 A1 | 3/2002 | Inoue et al. | |
| 2002/0063034 A1 * | 5/2002 | Dobbins | 194/302 |
| 2002/0063035 A1 | 5/2002 | Blad et al. | |
| 2002/0065885 A1 | 5/2002 | Buonanno et al. | |
| 2002/0096564 A1 | 7/2002 | Bellis, Jr. et al. | |
| 2002/0103663 A1 * | 8/2002 | Bankier et al. | 705/1 |
| 2002/0111886 A1 | 8/2002 | Chenevich et al. | |
| 2002/0111907 A1 * | 8/2002 | Ling | 705/41 |
| 2003/0149630 A1 | 8/2003 | Jacobs et al. | |
| 2003/0163382 A1 * | 8/2003 | Stefanik et al. | 705/26 |
| 2003/0217005 A1 | 11/2003 | Drummond et al. | |
| 2004/0249718 A1 | 12/2004 | Kuroda et al. | |
| 2005/0096994 A1 | 5/2005 | Drummond et al. | |
| 2005/0108168 A1 | 5/2005 | Halpin et al. | |

FOREIGN PATENT DOCUMENTS

| | | |
|---|---|---|
| JP | A 02-217987 | 8/1990 |
| WO | WO 03/046841 A1 | 6/2003 |
| WO | WO 03/046842 A1 | 6/2003 |
| WO | WO 03/046845 A2 | 6/2003 |

OTHER PUBLICATIONS

Office Action issued in U.S. Appl. No. 10/524,113; Feb. 19, 2010.

* cited by examiner

COUNT AND LOGIN MANAGEMENT

This application claims priority from the following U.S. Provisional Patent Applications: 60/408,303, filed Sep. 6, 2002, 60/448,484, filed Feb. 21, 2003, 60/460,055, filed Apr. 4, 2003 and 60/460,420, filed Apr. 7, 2003.

BACKGROUND OF THE INVENTION

1. Field of Invention

This invention generally relates to the use and management of payment media within a retail environment. In particular, the invention relates to methods, apparatuses, systems to enable secure, auditable, efficient, and cost effective movement of payment media both within the retail environment and to final reconciliation with a banking institution.

2. Description of Related Art

There are a numerous issues facing a retailer with respect to managing payment media flow, including for example, loss due to fraudulent activity or accounting errors, increased resource and equipment costs associated with handling large quantities of payment media on site, the need to reduce the cost of handling and preparing payment media by third parties such as cash-in-transit (CIT) operators, and a requirement to secure the integrity of the payment media audit trail both within the retailer and potentially while the payment media is in transit. Each of these issues is discussed in more detail below.

Loss Due to Fraudulent Activity

As with all environments where payment media is present, fraudulent activity is a key concern. Examples of fraudulent activity include the passing of counterfeit currency, which may be accidentally or deliberately accepted by a cashier. As counterfeit currency is not legal tender and will not be accepted as such by a commercial bank, the acceptance of it by the retailer constitutes a loss. It is also known for cashiers to deliberately pass excess change to associates or seek to defraud the retailer by not entering the correct value for goods. Such loss events are not confined to the shop/retail store floor and may take place in the back office either before or after the payment media has been counted and/or prepared for cash-in-transit (CIT) or a commercial bank. Essentially, any point where there is human intervention or handling of payment media presents an opportunity for fraudulent activity. As a result, any party receiving payment media has to recount it in order to be certain the correct amount has been passed. The recounting of payment media is costly and time consuming. If human intervention can be limited or avoided then the need to recount the payment media is also reduced or avoided.

Increased Resource Salary Costs to the Retailer

Retailers need to know the amount of payment media they are passing on to the CIT operator or commercial bank otherwise any loss while the payment media is in transit or with the CIT/Bank will have to be absorbed by the retailer. Because such situation is unacceptable to the retailer, in general, the payment media is counted before being picked up by the CIT Logistics. The counting activity is costly, time consuming and requires human intervention and the consequent exposure to fraudulent activity. However, it is essential the retailer know exactly how much payment media they are passing out to a CIT or commercial bank so they currently have to employ additional staff or reallocate resource to this activity.

There are additional issues where a retailer is reallocating staff from other duties or requiring staff to carry out the counting function as part of their usual retail staffing duties. Notably, it should be appreciated that unlike banking staff who are trained to handle payment media and equipment, many retail staff are only given very brief training. Therefore, the counting process needs to be as simple as possible. The retail staff should not be required to interact to any great extent with the equipment or be required to make, sometimes difficult, decisions, such as, for example, the provision of till start funds or denomination distributions when issuing change.

Reduce the Cost of Handling and Preparing Payment Media by Third Parties

Large retailers are required to present payment media to a CIT payment media processor or commercial bank in a given format. This format may be governed by the commercial bank or the CIT to enable them to count and reconcile the payment media as quickly and efficiently as possible. The responsibility is therefore on the retailer to ensure the payment media deposit is prepared correctly before passing to the bank. Where the retailer does not or cannot prepare the payment media, CIT operators may be used to prepare the payment media away from the retail site. This is very expensive and generally not a cost effective solution other than for the largest of retailers. Also, because an additional payment media handling process is being carried out with human intervention, there is another exposure to fraudulent activity.

Provision of a Secure Audit Trail

Currently within most retail environments, a retailer is unable or finds it difficult to determine at what point payment media loss is occurring. For example, in many retail outlets a cashier will log onto a till at the start of a shift and log off at the end. Typically, the till position will be taken up by another cashier who works the next shift. Further, cashiers may log on and off of tills during a shift dependent upon the number of tills that need to be open at any one time due to customer demand. In addition, tills may be emptied either periodically or only at the end of a day. Thus, it is very rare that a till will be cashed at the same time the cashier logs on or off. Consequently, identifying which cashier was operating the till when a loss was incurred is near impossible. The retailer would wish to know which cashier was operating the till at the time when a loss occurred so the cashier can either be retrained, if the loss was a legitimate accident, or disciplined if the loss was deliberate and unlawful. Thus, in the back office and CIT operator, it is desirable to avoid human intervention during the payment media handling process.

Being able to secure the audit trail also provides a greater degree of confidence to the commercial banks that the reconciled payment media total is the same as that being passed physically, if this is the case, via the CIT. Being able to secure the audit trail during payment media movement from the till to the bank, it is possible to remove the need for the bank to recount the payment media, thereby enabling the recipient bank to credit the retailer's account earlier.

FIG. 1 schematically illustrates a current payment media management cycle 1 within a retail environment. As shown in FIG. 1, payment media 5 is accepted from a customer at a till 20. It will be noted that in the majority of retailers there will be more than one till, including for example tens of tills 20a-n. Dependent upon the retailer, the payment media 5 may be taken directly to the back office 30 to be reconciled or taken via a supervisor 25. The supervisor 25 collects the payment media 5 and may also issue change or start funds as and when required. Irrespective of the route, the payment media 5 is taken to a secure back office area 30 for counting and reconciling internally.

Once counted and reconciled, the payment media is taken once a week or more to a Cash in Transit (CIT) operator 40.

The transportation of payment media is usually via a secure CIT logistics operator 42. Once the payment media is in the CIT 40, it usually has to be prepared and put into a format suitable for high speed sorting and counting. This preparation process is very time consuming and expensive. Once prepared, the payment media 5 is counted and reconciled. Dependent upon the CIT operator's relationship with a commercial bank, the payment media may or may not be then taken to the commercial bank 50. Increasingly, the payment media 5 is held at the CIT 40 and redistributed back to retailers 10. The bank 50 receives details of the payment media amount from the CIT 40 and credits the retailer's account 10 accordingly. This cycle from retailer accepting payment media from a customer to having their account credited may take a significant time. The period of time is governed by the payment media cycle within which the retailer is operating.

There are generally two main payment media cycles utilized by retailers, a Traditional Banking cycle and the Prime Count cycle. In both payment media cycles, the trading week typically runs from Sunday to Saturday, however, this may not always be the case.

Considering first the Prime Count cycle, the payment media is collected by a CIT logistics operator on a Monday. It is then delivered and through Tuesday prepared in a suitable format for counting. On the Wednesday the payment media is then counted and finally the retailer's account is credited on the Thursday. If there is a very high volume of payment media the preparation and counting may take several days each and thus delay the crediting of the account. For some retailers who take very large volumes of payment media, it can be more economically viable to have multiple collections during the retail week.

Within the Traditional Banking cycle, generally, the retail week also runs from Sunday to Saturday. On Monday, the retailer will collect the payment media, which is then counted and reconciled internally on the Tuesday. Late Tuesday the payment media is collected and taken to the CIT operator. The CIT operator prepares and counts the payment media on Wednesday and into Thursday as appropriate for the volume of payment media. Finally, the retailer has their account credited on the Thursday or Friday.

The time required by the CIT is very much dependent upon the volume of payment media and the amount of preparation required. It is preferable to retailer to improve this situation in two ways. Firstly, the retailer would like to limit the cost of the CIT logistics, preparation and counting operations. Secondly, the retailer would like their account to be credited far sooner.

SUMMARY OF THE INVENTION

This invention provides systems and methods that minimize or remove human intervention during the payment media handling process on the shop floor, in the back office and at the CIT. By automating processes and providing physical, tamper evident secure means for transporting the payment media, it is possible to limit, if not remove, the need for retail staff to handle payment media.

This invention provides systems and methods that enable the retailer to count, reconcile and prepare the payment media in a format that is acceptable to the commercial banks, thus removing the need for CIT operators to handle the payment media beyond the transportation requirement.

This invention provides systems and methods for a secure audit trail that detail payment media movement from the payment media originating source to the bank. By providing security and integrity for both the physical payment media and audit trail it is possible to remove the need for payment media to be recounted by the commercial bank and in consequence the retailer could have their bank account credited far sooner than is currently the case.

This invention provides systems and methods for reconciling payment media receipts at or as near the payment media originating source as possible. This enables a retailer to quickly identify which payment media originating sources are falling short.

This invention provides systems and methods that provide a secure environment for payment media and/or payment media handling in the retail store, including the back office.

This invention provides systems and methods that enable the retailer to manage the payment media internally, reissuing payment media back into the retail store in a fully audited manner. The reissue of payment media may be for example restocking ATM's, or payment media originating source floats. This enables the retailer to minimize the amount of payment media that needs to be handled by the CIT and bank.

This invention provides methods and systems for controlling a machine that accepts payment media and that requires a user login operation. In one exemplary embodiment, the method comprises the steps of receiving the payment media in an input receptacle of the machine; starting processing of the payment media that has been received in the input receptacle; and performing the user login operation, wherein the step of performing the user login operation can be done before, during or after the step of processing the payment media.

In one exemplary embodiment, the method may further comprise storing the payment media received in the input receptacle in a secure device until the user login operation is completed. The secure device may comprise one or more of a roll store in the machine, an escrow device in the machine, or a secure compartment in the machine.

In various exemplary embodiments, the user login operation may be performed at the machine, from a location electronically coupled to the machine over a local communication network, or from a remote location electronically coupled to the machine over a wide area communication network.

In one exemplary embodiment, the machine is located in a retail store, and the user is a cashier of the retail store, a teller, an individual having minimal training in the operation of payment media handling devices or an individual not skilled in the operation of payment media handling devices. A retail store may include one or more of at least a single store, multiple stores, one or more third party concession stands located within a single store and two or more stores located within a mall.

In one exemplary embodiment, the machine is located in a retail store, and the user is an employee of a company different from the retail store.

In another exemplary embodiment, the machine is located at a central location, and users of the machine are employees from plural companies having access to the central location.

Processing of the payment media may comprise feeding the payment media through the machine, and the user login operation is performed while the payment media is being fed through the machine.

In one exemplary embodiment, the processing of the payment media includes at least one of counting the payment media, determining a denomination of the payment media and authenticating the payment media. The payment media may include one or more of at least currency notes, currency coins, currency vouchers and currency checks.

In one exemplary embodiment, the machine is capable of dispensing payment media previously accepted into the machine.

In one exemplary embodiment, the processing of the payment media is cancelled following a plurality of user login operation failures. Following the plurality of user login operation failures, the machine may return to a user the same payment media that was placed into the input receptacle by the user.

In one exemplary embodiment, the same the payment media stored in the escrow device is returned to an user following an unsuccessful login operation.

In one exemplary embodiment, the method further comprises notifying a user that the payment media processing has been successfully completed upon occurrence of a successful user login and completion of the processing.

In one exemplary embodiment, the method further comprises storing the payment media in the machine upon a determination of a successful user login operation and completion of the processing.

In one exemplary embodiment, the user login operation is performed using a user interface of the machine. The user interface may include a touch screen.

In one exemplary embodiment, the method further comprises creating an event log file that includes at least one of a time of day, a transaction value for the event, payment media handling apparatus information, payment media originating source information. The event log file may be stored in the payment media handling apparatus or remotely from the payment media handling apparatus.

In various exemplary embodiments, the user login operation uses one or more of a personal identification number login verification process, a biometric verification process, a smart card, a magnetic stripe card and a radio-frequency identification device.

In another one exemplary embodiment according to this invention, there is provided a machine-readable storage medium that provides instructions for controlling a machine that accepts payment media and that requires a user login operation, the instructions, when executed by a processor, cause the processor to perform operations comprising the steps of receiving the payment media in an input receptacle of the machine; starting processing of the payment media that has been received in the input receptacle; and performing the user login operation, wherein the step of performing the user login operation can be done before, during or after the step of processing the payment media.

In one exemplary embodiment, the steps may further comprise storing the payment media received in the input receptacle in a secure device until the user login operation is completed. The secure device may comprise one or more of a roll store in the machine, an escrow device in the machine, or a secure compartment in the machine.

In various exemplary embodiments, the user login operation may be performed at the machine, from a location electronically coupled to the machine over a local communication network, or from a remote location electronically coupled to the machine over a wide area communication network.

In one exemplary embodiment, the machine is located in a retail store, and the user is a cashier of the retail store, a teller, an individual having minimal training in the operation of payment media handling devices or an individual not skilled in the operation of payment media handling devices. A retail store may include one or more of at least a single store, multiple stores, one or more third party concession stands located within a single store and two or more stores located within a mall.

In one exemplary embodiment, the machine is located in a retail store, and the user is an employee of a company different from the retail store.

In another exemplary embodiment, the machine is located at a central location, and users of the machine are employees from plural companies having access to the central location.

Processing of the payment media may comprise feeding the payment media through the machine, and the user login operation is performed while the payment media is being fed through the machine.

In one exemplary embodiment, the processing of the payment media includes at least one of counting the payment media, determining a denomination of the payment media and authenticating the payment media. The payment media may include one or more of at least currency notes, currency coins, currency vouchers and currency checks.

In one exemplary embodiment, the machine is capable of dispensing payment media previously accepted into the machine.

In one exemplary embodiment, the processing of the payment media is cancelled following a plurality of user login operation failures. Following the plurality of user login operation failures, the machine may return to a user the same payment media that was placed into the input receptacle by the user.

In one exemplary embodiment, the same the payment media stored in the escrow device is returned to an user following an unsuccessful login operation.

In one exemplary embodiment, the steps further comprise notifying a user that the payment media processing has been successfully completed upon occurrence of a successful user login and completion of the processing.

In one exemplary embodiment, the steps further comprise storing the payment media in the machine upon a determination of a successful user login operation and completion of the processing.

In one exemplary embodiment, the user login operation is performed using a user interface of the machine. The user interface may include a touch screen.

In one exemplary embodiment, the steps further comprise creating an event log file that includes at least one of a time of day, a transaction value for the event, payment media handling apparatus information, payment media originating source information. The event log file may be stored in the payment media handling apparatus or remotely from the payment media handling apparatus.

In various exemplary embodiments, the user login operation uses one or more of a personal identification number login verification process, a biometric verification process, a smart card, a magnetic stripe card and a radio-frequency identification device.

In yet another exemplary embodiment according to this invention, there is provided a machine that accepts payment media and that requires a user login operation, the machine comprising an input receptacle into which a user of the machine places the payment media; a user interface through which the user of the machine performs a user login operation; and a controller that starts processing of the payment media that has been received in the input receptacle and that performs the user login operation either before, during or after processing the payment media.

In various exemplary embodiments, the machine further comprises storing the payment media received in the input receptacle in a secure device until the user login operation is completed. The secure device may comprise one or more of a roll store in the machine, an escrow device in the machine, or a secure compartment in the machine.

The user login operation may be performed at the machine, from a location electronically coupled to the machine over a local communication network, or from a remote location electronically coupled to the machine over a wide area communication network.

The processing of the payment media may comprise feeding the payment media through the machine, and the user login operation is performed while the payment media is being fed through the machine. Processing of the payment media may include at least one of counting the payment media, determining a denomination of the payment media and authenticating the payment media. The payment media is one or more of at least currency notes, currency coins, currency vouchers and currency checks.

In various exemplary embodiments, the controller also controls the machine to dispense payment media previously accepted into the machine. The controller may cancel the processing of the payment media following a plurality of user login operation failures. Following the plurality of user login operation failures, the controller also causes the machine to return to the user the payment media that was placed into the input receptacle by the user.

In various exemplary embodiments, the controller cancels the processing of the payment media following a plurality of user login operation failures and returns the payment media stored in the escrow device to an user.

In various exemplary embodiments, the controller uses the user interface to notify the user that the payment media processing has been successfully completed upon occurrence of a successful user login and completion of the processing. The user interface may be a touch screen.

In various exemplary embodiments, the controller further creates an event log file that includes at least one of a time of day, a transaction value for the event, payment media handling apparatus information, payment media originating source information. The event log file may be stored in the payment media handling apparatus or remotely from the payment media handling apparatus.

BRIEF DESCRIPTION OF THE DRAWINGS

The current invention will now be described in detail by way of examples and by reference to the following figures, in which.

DETAILED DESCRIPTION OF PREFERRED EMBODIMENTS

The methods, apparatuses and systems of this invention enable secure, auditable, efficient and cost effective movement of payment media both within the retail environment and to final reconciliation with a banking institution.

Figure 1:
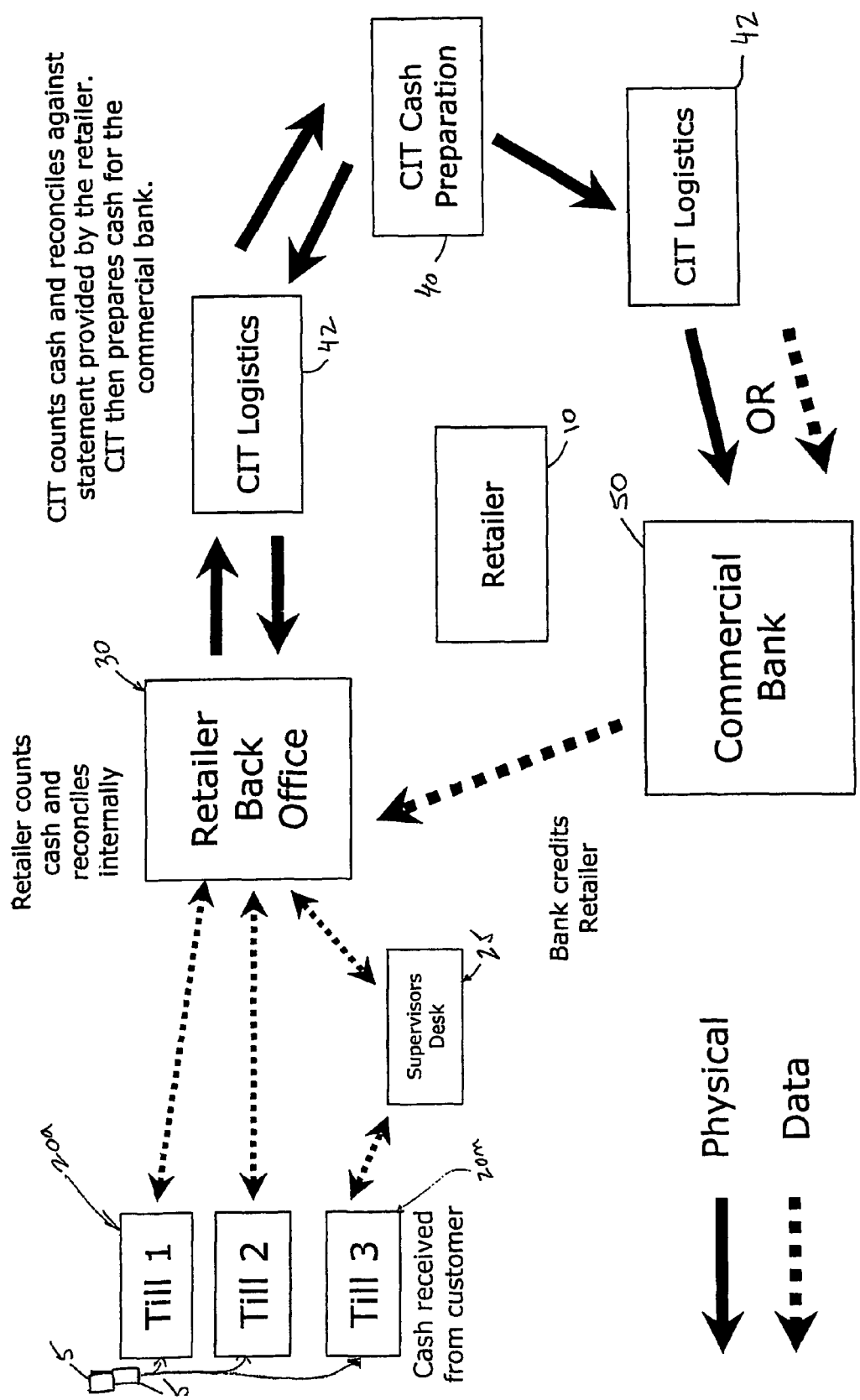
FIG. 1 shows a schematic illustration of the current retail payment media management cycle.
Figure 2:
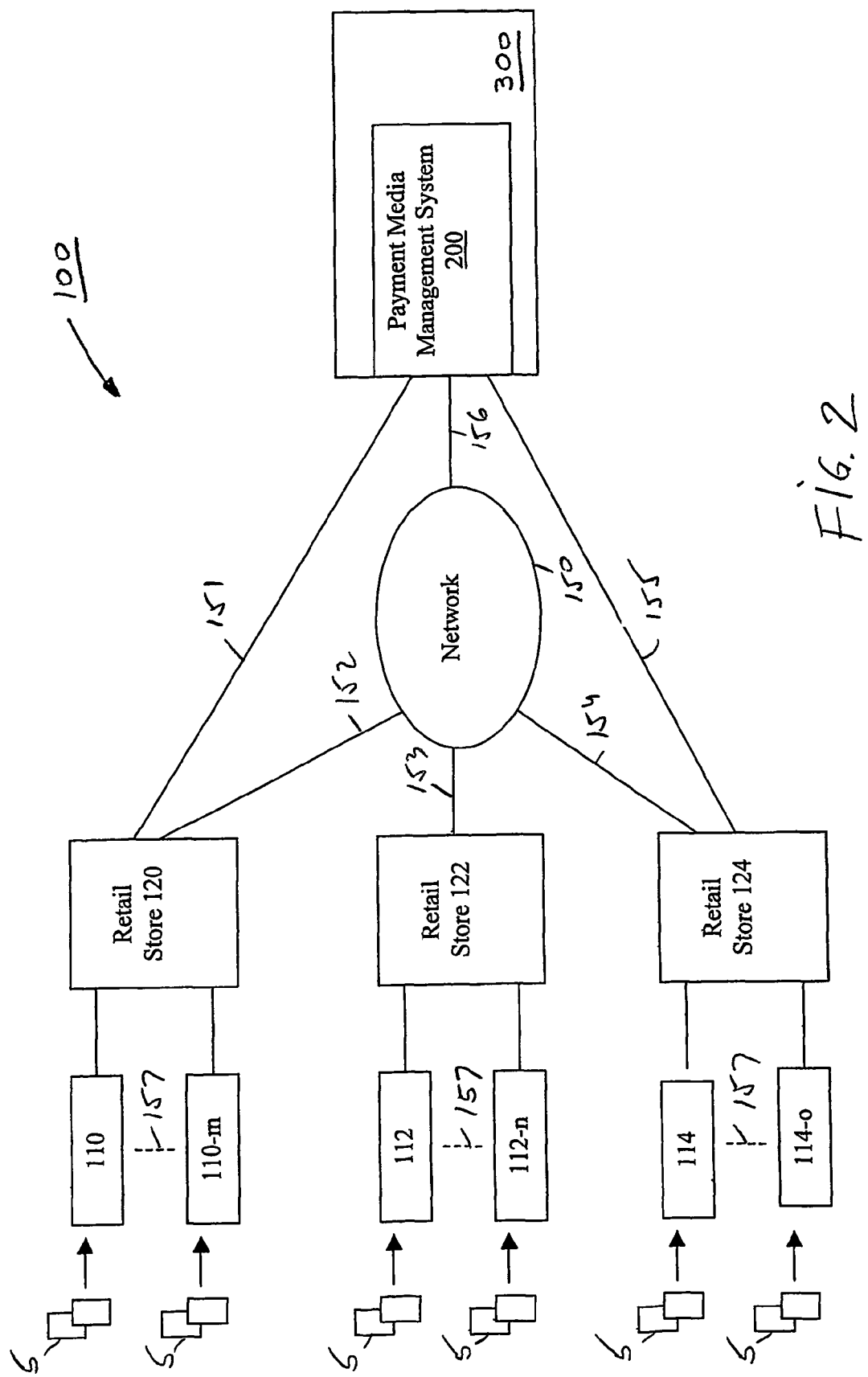
FIG. 2 shows one exemplary embodiment of a payment media network environment using the systems and methods of this invention.

FIG. 2 shows one exemplary embodiment of a payment media network environment 100 using the systems and methods of this invention. As shown in FIG. 2, the payment media network environment 100 employs an exemplary embodiment of a payment media management system 200 to process payment media 5 received from a customer during a retail transaction or other commercial transaction. It will be appreciated that within this document the term payment media is used in its broadest sense and includes, but is not limited to, cash currency notes, coins, vouchers, checks, scrip, debit cards and credit cards transactions plus their resulting paper receipts and electronic payment media.

As shown in FIG. 2, the payment media network environment 100 includes one or more payment media originating sources 110, 112, 114 that are located in one or more retail stores 120, 122, 124. Payment media originating sources 110, 112, 114 in the one or more retail stores 120, 122, 124 are electronically coupled to a payment media management system 200 via a communication network 150 and communication links 152-154 and 156. Alternatively, one or more payment media originating sources 110, 114 in one or more retail stores 120, 124 may be coupled directly to the payment media management system 200 via communication links 151, 155, thus, bypassing the communication network 150. Moreover, payment media originating sources within a retail store may be electronically coupled to each other via a communication link 157.

It will be appreciated that within the context of this document, a payment media originating source may include one or more of at least a retail till, a retailer back office, a coin redemption device, a third party retail concession, or other types of devices, such as, for example, an automatic teller machine, that are used in a retail environment and/or in a commercial cycle.

The communication network 150 includes, but is not limited to, for example, local area networks, wide area networks, storage area networks, intranets, extranets, the Internet, or any other type of distributed network, each of which can include wired and/or wireless portions. Further, communication links 151-157 can be any known or later developed device or system for connecting the payment media management system 200 to the communication network 150, including a connection over public switched telephone network, a direct cable connection, a connection over a wide area network, a local area network, a storage area network, a connection over an intranet or an extranet, a connection over the Internet, or a connection over any other distributed processing network or system.

In one exemplary embodiment, one or more payment media originating sources 110, 110-*m* coupled to payment media management system 200 are physically located in the same retail store. In another exemplary embodiment, multiple payment media originating sources 110, 110-*m*, 112, 112-*n*, 114, 114-*o* coupled to the payment media management system 200 are physically located in different retail stores or retail establishments. In yet another exemplary embodiment, in addition to the retail store-owned payment media originating sources, one or more payment media originating sources representing a third party retail store and/or third party retail concession stand may be located within the retail store. In a further exemplary embodiment, one or more payment media originating sources, each payment media originating source representing a third party retail store or retail concession stand, may be located within an outlet mall type retail store or commercial establishment. In various exemplary embodiments, the payment media originating sources may or may not be electronically coupled to the payment media management system 200.

In various exemplary embodiments, the payment media management system 200 is employed to perform various steps, actions or functions within the retail environment, including, for example to:

1. Automatically determine and/or manage an appropriate payment media management solution;
2. Issue a start fund at the start of the day, or operator shift, for a payment media originating source;
3. Issue change upon demand;
4. Accept payment media originating source deposits at intervals during the day;
5. Prepare and issue a bank deposit automatically and/or upon demand;
6. Prepare and issue a payment media advance upon demand;
7. Prepare, store, report and communicate payment media management system inventories, audits, safe counts and similar activities;
8. Make advances to the payment media management system machine(s) from a vault safe, an armored car safe, or other safes than the payment media management system machine;
9. Prepare and store desirable payment media management information, such as, for example, lists of legal payment media originating sources or payment media registers for one or more retail operations, lists of breakdowns of money denominations and species that make up CIT (e.g., armored car) and/or bank deposits; starting inventories of payment media originating sources; lists of point of sale, or POS, transactions associated with payment media originating sources; legitimate sales dates; special sales dates; etc.
10. Manage more than one retail operation within a given store, e.g., grocery and clothing operations in a single store, by a single payment media management system, and/or management of more than one retail store, e.g., closely situated stores, by the same payment media management system;
11. Provide enhanced communication functions, including use of various types of communications networks (LAN, WAN, internet, intranet, etc.) as well as using RF and other communication technologies, among payment media management system machines, safes, front offices, back offices, remotely located personnel and operations; auditing trail communication, supervisory notifications, etc.;
12. Provide foreign currency conversion and foreign currency storage and handling, e.g., in certain locations, e.g., in retail locations near foreign countries, banking centers, etc.;
13. Provide methods and systems, including pre-programmed error detection and correction schemes, user interface menus, scripts and other guidance to facilitate overcoming malfunctions, e.g., currency jams, tears, etc., and unauthorized, including fraudulent, uses of payment media management system devices, as well as communication of malfunction status to responsible parties, e.g., police officials, maintenance technicians, supervisors, customers, etc.;
14. Provide audio/visual instruction and feedback to an operator by utilizing user-friendly characteristics of payment media management system facilities, devices, and methods;
15. Provide audit and audit trail generation, physical security measures, dealing with payment media shortages and payment media management errors;
16. Provide for methods of dealing with and/or reacting to security incidents, including robberies, alarms (including false alarms), to include agendas, scripts, lockdowns, notification of authorities, supervisory notifications, etc.;
17. Permit withdrawals from payment media management system devices by personnel other than cashiers using established procedures, authorization levels, etc.

All these functions may be carried out with minimal input from the users so as to limit the users' time at the payment media handling apparatus and the need for the users to make decisions or manipulate the function of the apparatus. The methods, systems and products of this invention enable all the above functions to be carried out and provide an intelligent, secure and user friendly interface.

Figure 3:
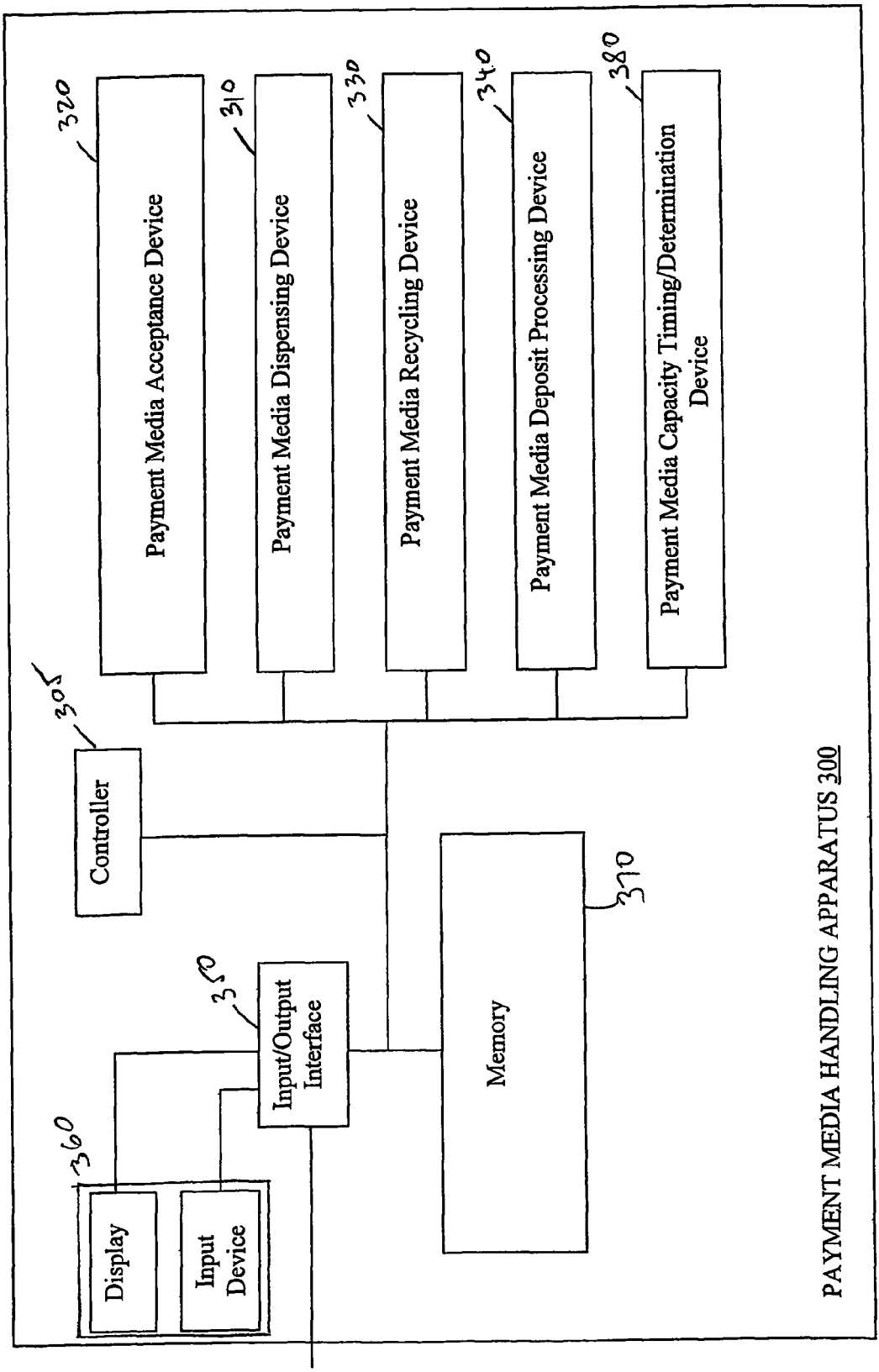
FIG. 3 schematically illustrates one exemplary embodiment of an apparatus that may be used with the payment media management system according to this invention.

FIG. 3 schematically illustrates an exemplary embodiment of an apparatus 300 that uses the payment media management system 200 to perform the steps, actions or functions discussed above and thus provide a secure auditable physical payment media flow and a secure auditable digital payment media flow. It will be appreciated that the exemplary apparatus shown in FIG. 3 is non-limiting, and alternative apparatuses could be utilized.

As shown in FIG. 3, apparatus 300 is a payment media handling apparatus that includes a controller 305 and one or more of at least a payment media dispensing device 310, a payment media acceptance device 320, a payment media recycling device 330 and a payment media deposit processing device 340. The payment media handling apparatus 300 further includes a user interface 350 coupled to the controller 305. The user interface may include various formats, including a graphical user interface having a touch screen 360. The payment media handling apparatus 300 further includes a memory 370. In various exemplary embodiments, the payment media handling apparatus 300 may include other devices, such as for example a payment media capacity timing and determination device 380.

In one exemplary embodiment, at a most basic level, apparatus 300 may include entry level payment media counting equipment, such as, for example the '2650' sold by De La Rue Cash Systems, connected to a suitable local area network.

More typically it is envisioned that the solution utilizes more advanced payment media acceptance and dispensing equipment, such as, for example, the Mach® series of coin counters and sorters, one of the TCD range of payment media dispensers, or the TDU range of payment media acceptors, all available from De La Rue Cash Systems. Preferably, the payment media acceptance and dispensing processes may be performed using a single machine, such as the TCR Twin Safe™ sold by De La Rue Cash Systems for example. Such devices handle multiple payment media types, including bills and coins, for example. Further examples of such devices include the De La Rue Retail Payment Solutions "Power Encode" for check encoding and settlement, and the De La Rue "2000", "4000" and "6000" "Cash Counters". Typically such automated counting devices are connected to a controller 305, such as a personal computer but, in some instances, the controlling device forms part of the counting device. Indeed, more than one counting device may be connected to a single controlling device, or a single counting device may be connected to multiple controlling devices, or multiple counting devices may be connected to multiple controlling devices.

It should be appreciated that the current invention is not limited by the above equipment. The systems and methods of this invention use such apparatus as a means for implementing the invention. The systems and methods of this invention can also make use of apparatus that is supplied by other manufacturers.

Payment Media Management

As part of a retailer's operating cycle, it is generally routine for the retailer to perform various payment media operations, such as, for example, accepting accumulated payment media from various payment media originating sources, e.g., store tills, providing a payment media start fund to one or more payment media originating sources in the store, providing payment media changes on demand, providing payment media advances, or making payment media deposits. Because these payment media operations need to be performed for many payment media originating sources in one or more retail stores through the day, automatically managing the payment media flow to provide a required payment media management solution is highly desirable.

Figure 4:
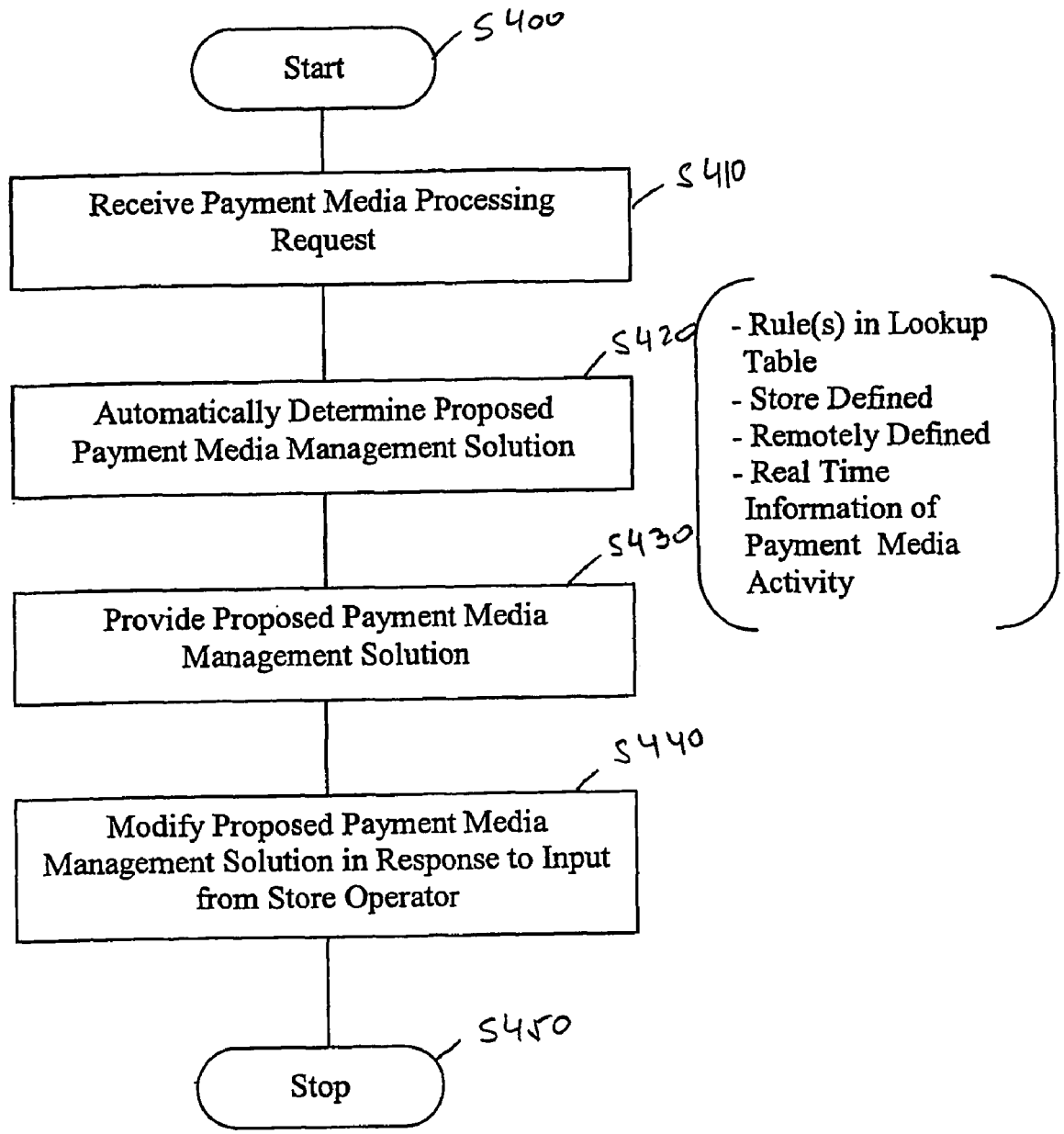
FIG. 4 is a flowchart outlining one exemplary embodiment of a method of electronically managing payment media in a retail store according to this invention.

FIG. 4 is a flowchart outlining one exemplary embodiment of a method of electronically managing payment media in a retail store. In this context, the retail store may be defined to include a single retail store, multiple stores electronically coupled to the payment media management system 200 (shown in FIG. 2), one or more third party concession stands located within a single store, two or more stores located within a mall, and the like. Generally, the retail store defined above includes one or more payment media originating sources.

As shown in FIG. 4, the method begins in step S400, and continues to step S410, where a payment media processing request is received from an operator, or is automatically provided by a controller in response to instructions stored on a medium. Preferably, electronically managing payment media is performed automatically and no further intervention is required from the requesting entity. This both speeds up the process and limits the need for users to be concerned about the event because all the processing and thought behind the transaction has been done for them.

Next, in step S420, a proposed payment media management solution is determined based on one or more of at least a group of rules stored in a lookup table, instructions provided for the retail store, instructions provided by an entity other than the retail store, and instructions based on real time or substantially real time analysis of payment media activity information that is electronically obtained in the retail store during a predetermined period of time.

In one exemplary embodiment, the rules may include a consideration of one or more of a retailer type, retailer size, retailer location, type of payment media originating source where the proposed payment media management solution is to be provided, the specific payment media originating source for which the proposed payment media management solution distribution is requested, time of day for the proposed payment media management solution distribution, calendar date for the proposed payment media management solution distribution, calendar date of national or local holidays, calendar date of scheduled festivities or organized events, and retail store scheduled sales event, as well as the specific rules enumerated herein for the various solutions provided, e.g., bank deposit.

In another exemplary embodiment, a proposed payment media management solution may be based on criteria defined by store policy. These criteria may be included in a lookup table.

In an alternate exemplary embodiment, a proposed payment media management solution may be based on criteria defined by an entity/authority located remotely from the retail store. This is essentially the process as described and defined by store policy. The advantage here is that a remote authority, such as a head office, has the ability to determine and control which solutions would be administered for a specific payment media originating sources in a particular store. This may be preferable for large retailers who wish to monitor payment media flow and payment media management from a central point and as such need the ability to define key store payment media policies.

In a further alternate exemplary embodiment, a proposed payment media management solution may be performed based on criteria based on real time data analysis. In this embodiment, the apparatus is electronically coupled (i.e., networked) with one or more payment media originating sources. Using electronic point of sale (EPOS) data acquired from the one or more payment media originating sources, a payment media management solution may be based on real time data and data obtained at substantially real time. By monitoring the payment media inflow and outflow of a payment media originating source over a period of time it is possible to predict the probable payment media management solution. Such forecasting applications have been developed for ATM payment media management and payment media management in the wider financial markets. One example of such software is Prognis sold by De La Rue Cash Systems.

Such an approach would allow for the accurate prediction of payment media management solutions and limit the need for supervisors, head office or users to concern themselves so deeply with the predicting the payment media operation needed by a payment media originating source. Such direct networking of the payment media originating sources to the apparatus has further advantages including improved payment media accounting and reconciling.

The inventors have also recognized that an increasing number of retailers restock Automatic Teller Machines (ATMs) that are present on their premises. The exemplary embodiment includes the management of such ATM facilities as well. In doing so, the retailer can further limit the amount of payment media that needs to be transported and counted off site thus reducing cost.

The systems and methods according to this invention provide the ability to maintain and issue multiple payment media management solution profiles, and to accept updated profiles from external systems such as, for example, EPOS, Cash Office/Cash Management and/or optimizing systems. For example, a retail store's service desk or refunds counter typically has to keep large amounts of payment media on hand for refunds and for providing start funds. The ability to modify the amount and time of dispensing of payment media funds is also included in the system and methods according to this invention.

Next, in step S430, the payment media handling apparatus may then automatically provide the payment media management solution to the operator/user or alternatively display the solution. If the payment media management solution is displayed prior to implementation, the user will be given the option to accept or decline the proposed payment media management solution. If accepted, the payment media management solution is effected. However, if declined, the payment media management solution process may be cancelled or the user prompted to enter an alternative payment media management solution. Once the payment media management solution is defined by the user and so long as sufficient funds are present within the apparatus, the payment media management solution is performed (step S440). Operation then continues to step S450, where operation of the method stops.

Payment Media Start Fund Management

Figure 5:
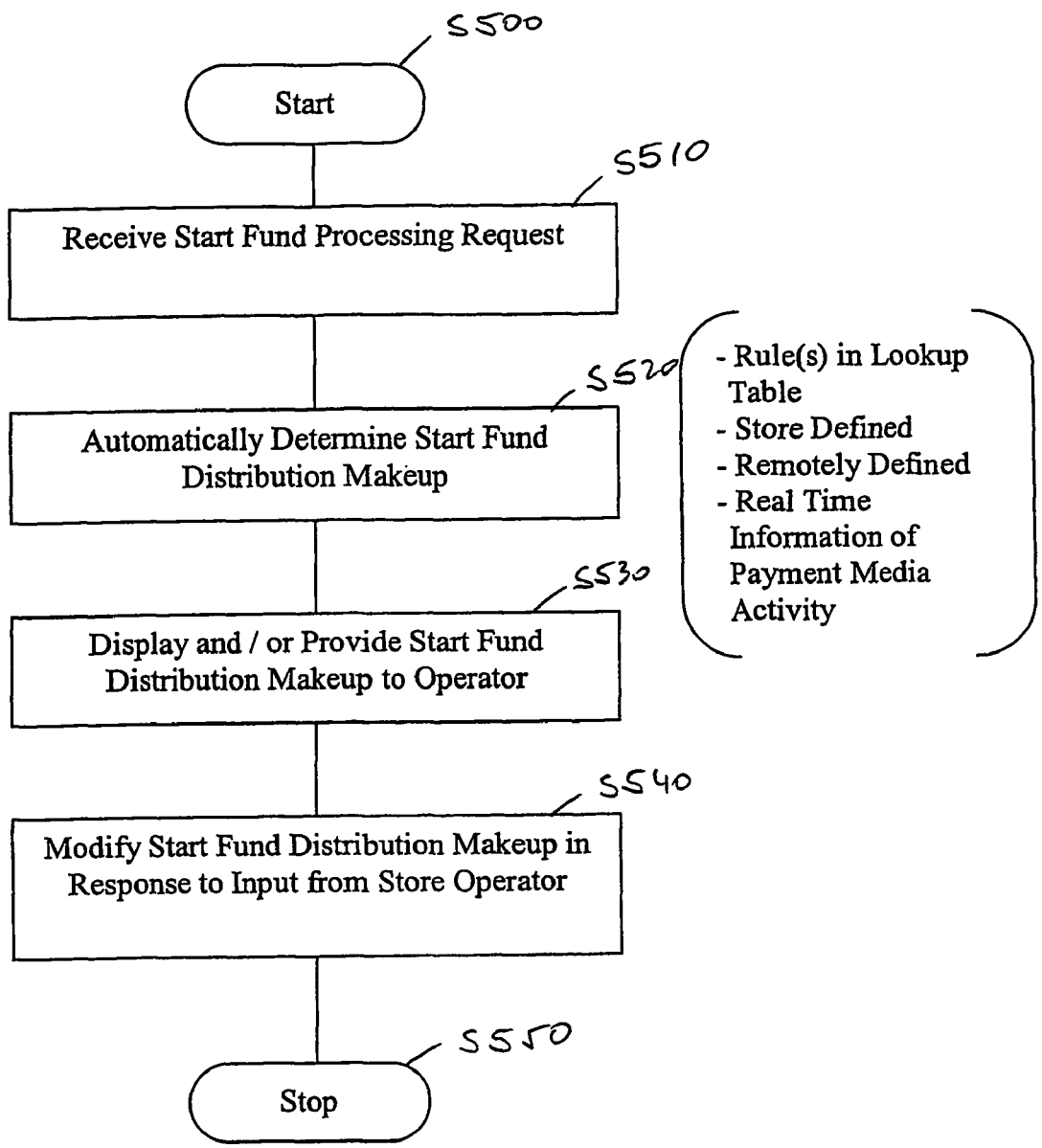
FIG. 5 is flowchart outlining one exemplary embodiment of a method of electronically determining a start find according to this invention.

FIG. 5 is flowchart outlining one exemplary embodiment of a method of electronically determining a start fund. It is standard practice within retailers to provide payment media originating sources with a start fund or float at the start of trading. The start fund provides the payment media originating source with sufficient payment media to be able to provide change during the initial period of trading. The size and denomination distribution of the find can vary dependent upon a number of factors, such as, for example, the size and location of retailer, time of day, week, year, and type of payment media originating source.

The size and location of a retailer can significantly influence the start fund. For example large out of town retailers will tend to cater to people doing a weekly shop and therefore making high value transactions. Such transactions are more likely to be paid for using electronic means such a debit and credit cards and as such the need for change is reduced. Smaller town centre retailers are likely to carry out a much larger number of smaller transactions, which are more likely to be paid for using cash media. Consequently, there is a greater need for the payment media originating source to contain large amounts of change.

The time of day, week and year can also have a great effect on the start fund required. The start fund needs to take into account people's shopping patterns. For example, because the majority of transactions within many retailers take place over the weekend and predominantly on a Saturday, the start fund needs to take account of this. Further, the time of year, national holidays, events, festivals and the like are likely to significantly influence the volume of trade and as such the start fund needs to be altered accordingly.

Finally, within many larger retailers and large grocers in particular, there is a variety of different types of payment media originating sources. For example, some payment media originating sources may be used in transactions with shoppers having ten items or less, some payment media originating sources may be cash only payment media originating sources, and some payment media originating sources may be partially or fully automated. Limited numbers of items are more likely to be paid for in cash and as such the need for change is greater, similarly for cash only payment media originating sources. Partially or fully automated payment media originating sources are more likely to receive payment via electronic means and thus, their need for a large start fund is reduced.

The methods and systems according to this invention provide a means to manage a start fund for one or more payment media originating sources without necessarily any additional input from an operator and/or an user requesting the start fund.

The method and systems according to this invention may be practiced using a payment media handling apparatus having a payment media dispensing device and optionally a payment media acceptance device. The payment media dispensing and acceptance device may be combined within a single apparatus and further to this be capable of recycling payment media. The apparatus also has a user interface, the user interface may be a traditional PC with a keyboard and a mouse or other pointing means such as a touch screen. In this embodiment and all subsequent embodiments the user interface may be presented in the style as a web browser. The format is increasingly familiar with users and as such provides a recognizable interface. The interface provides the means by which the user can easily interact with the payment media handling apparatus.

With reference to FIG. 5, typically the first operation carried out by the user will be to login and at least identify either themselves, their payment media originating source or both themselves and their payment media originating source (step S500, FIG. 5). Though this is preferable for security and auditing purposes, it is not essential to the current invention.

The user may request a start fund via the user interface. Alternatively, the request for start funds may be automatically performed and or initiated by the payment media management system (step S510, FIG. 5). If the user has not logged in or during the log in has not identified their payment media originating source they may be prompted to identify the payment media originating source for which they require the start fund. Once the start fund has been requested and the payment media originating source identified, the apparatus reviews by one of a number of means what the start fund should be in terms of value and denomination distribution (step S520, FIG. 5).

Next, the payment media handling apparatus may then automatically dispense the start fund or alternatively display the intended start fund (step S530, FIG. 5). If the start fund is displayed prior to dispense the user may be given the option to accept or decline the proposed start fund. If accepted, the start fund is dispensed, however, if declined, the start fund process may be cancelled or the user prompted to enter an alternative value and distribution for the start fund (step S540, FIG. 5). Once the start fund is defined by the user and so long as sufficient funds are present within the apparatus the fund is dispensed. The method then continues to step S550, where the operation of the method stops.

It is appreciated by the inventors that a retailer may not want to let all its staff define their own start funds and as such authority levels may be built in and may require supervisor assistance in order to carry out this operation. Preferably, the start fund is dispensed automatically and no further intervention is required from the user. This both speeds up the process and limits the need for users to be concerned about the event because all the processing and thought behind the transaction has been done for them.

Moreover, the payment media management system also provides the ability to change payment media start fund amounts, time of availability, etc., including the ability to predetermine and/or override predetermined payment media start fund aspects, including payment media amounts and time of availability.

As discussed above, the management of the payment media start fund may be based on a number of criteria, including, for example, rule based criteria, criteria defined by store policy, criteria defined by a policy provided remotely from the retail store, and criteria defined based on real time data analysis. Each of the exemplary criteria is discussed in more detail below.

The rule based criteria approach is the most simplistic and would rely on predefining a series of criteria. The type of criteria used would include those highlighted above such as size and location of retailer, type of payment media originating source and time of day, week, and year. Other criteria could also be used as appropriate. When a user identifies themselves the apparatus will review the criteria and issue the correct fund accordingly. For example the user has identified the payment media originating source, the apparatus knows the time of day, week and year and based on these simple criteria issues the appropriate start fund value and distribution.

Alternatively, management of the payment media start fund may be based on criteria defined by store policy. These criteria may be included in a lookup table whereby specific values and denomination splits can be defined against specific payment media originating sources. In one exemplary embodiment, a store manager or payment media room supervisor would define the value and denomination split for each of the payment media originating sources and enter these into the look up table. When a user requested a start fund for a particular payment media originating source the apparatus refers to the look up table and issues the appropriate start find.

The look up table could be completed offline and then up loaded in its entirety or just a single entry modified for a specific payment media originating source. Dependent upon the complexity of the look up table the values and denomination split could remain the same for a payment media originating source all day every day or vary dependent upon time of day, week, year or any other variable.

In an alternate exemplary embodiment, management of the payment media start fund may be based on criteria defined by an entity/authority located remotely from the retail store. This is essentially the process as described and defined by store policy. The advantage here is that a remote authority, such as a head office, has the ability to manipulate start funds. This may be preferable for large retailers who wish to monitor payment media flow and payment media management from a central point and as such need the ability to define key store payment media policies.

To perform this operation remotely, the apparatus must be networked by some communication device/link. This may include, for example, a dedicated connection, a closed network or a secure internet connection, or a secure telephone or facsimile connection.

In a further alternate exemplary embodiment, management of the payment media start fund may be performed based on criteria based on real time data analysis. In this embodiment, the apparatus is electronically coupled (i.e., networked) with one or more payment media originating sources. Using electronic point of sale (EPOS) data acquired from the one or more payment media originating sources, a start fund may be based on data obtained at real time or substantially real time. By monitoring the payment media inflow and outflow of a payment media originating source over a period of time it is possible to predict the probable start fund. Such forecasting applications have been developed for ATM payment media management and payment media management in the wider financial markets. One example of such software is Prognis sold by De La Rue Cash Systems.

Such an approach would allow for the accurate prediction of start funds and limit the need for supervisors, head office or users to concern themselves so deeply with the predicting the payment media needs of the payment media originating source. Such direct networking of the payment media originating sources to the apparatus has further advantages including improved payment media accounting and reconciling.

The inventors have also recognized that an increasing number of retailers restock Automatic Teller Machines (ATMs) that are present on their premises. The exemplary embodiment includes the management of such ATM facilities as well. In doing so, the retailer can further limit the amount payment media that needs to be transported and counted off site thus reducing cost.

The systems and methods according to this invention provide the ability to maintain and issue multiple start find profiles, and to accept updated profiles from external systems such as, for example, EPOS, Cash Office/Cash Management and/or optimizing systems. For example, a retail store's service desk or refunds counter typically has to keep large amounts of payment media on hand for refunds and users' start finds. The ability to modify the amount and time of dispensing of start funds is also included in the system and methods according to this invention.

Payment Media Change Management

Figure 6:
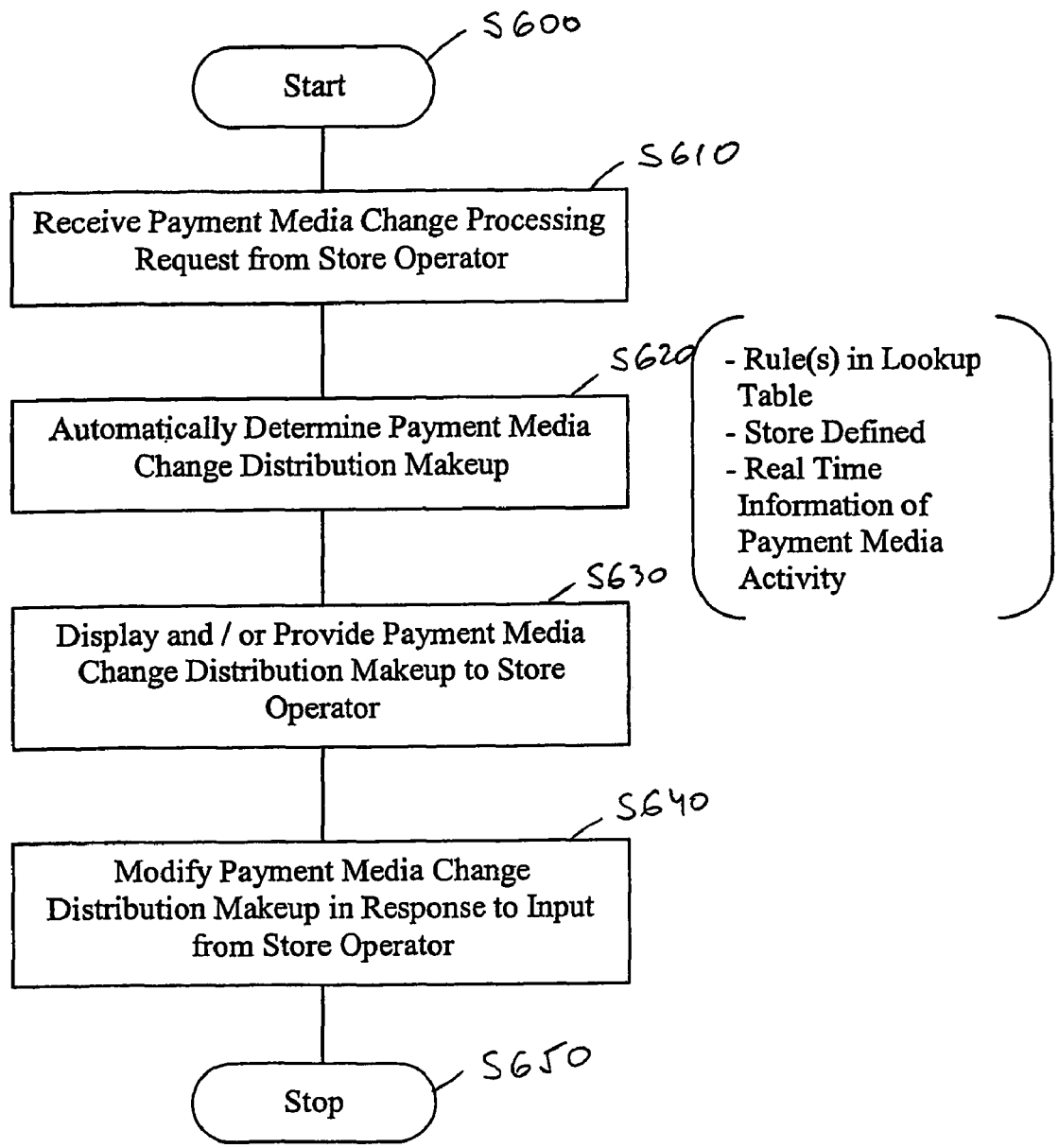
FIG. 6 is flowchart outlining one exemplary embodiment of a method of electronically processing a payment media change operation according to this invention.

Another aspect according to this invention provides a means to electronically manage a payment media change operation to a user in the most suitable denomination makeup. FIG. 6 is flowchart outlining one exemplary embodiment of a method of electronically processing a payment media change operation.

A payment media handling apparatus comprises a payment media acceptance device and a payment media dispensing device. The payment media acceptance and dispensing device may be combined within a single apparatus and further to this be capable of recycling payment media. The apparatus optionally also has a user interface, the user interface may be a traditional PC with a keyboard and a mouse or other pointing means such as a touch screen. The interface provides the means by which the user can easily interact with the payment media handling apparatus. The apparatus may also have the ability to allow users to login and identify either themselves, their payment media originating source or both themselves and their payment media originating source. Though this is preferable for security and auditing purposes, it is not essential to the current invention. Indeed, within the current embodiment it may be seen as a disadvantage to allow users to login. For the majority of instances the payment media change transaction will be a straight swap with a sum of money being exchanged for the same sum of money but in a different denomination split.

With reference to FIG. 6, the method begins by requesting a user to login (step S600, FIG. 6). However, this generally lengthens the time required for the user to spend at the machine. If wider functions are allowed, such as combining the issuance of a payment media advance in combination with dispensing change then logging in becomes more essential.

The user then indicates that they would like some change, this is typically done via the user interface but it is conceivable the apparatus could be placed in a default mode to give change unless prompted to do otherwise (step S610, FIG. 6). If in such a default mode the apparatus would assume it is to give change for any payment media placed in the acceptance device.

The user then places the payment media in the acceptance device and the payment media is accepted. The payment media acceptance device would typically have the ability to determine denomination and validity of deposited funds and thus, determine a payment media change distribution make up (step S620, FIG. 6). Any funds that cannot be identified would typically be returned to the user.

Alternatively, the finds may be accepted into a separate storage area and the user asked to identify the denomination. This latter approach may be used to prevent the user attempting to re-feed a note several times and thus spend an excessive period of time at the machine. This does present the opportunity for fraudulent activity but the retailer may prefer to accept this rather than have staff spend an extended period of time at the payment media handling apparatus. Further detail on the reject handling process is given later.

In addition to this, the user may also require a payment media advance in combination with the change. That is the user presents $50 but requires $100 in change. The apparatus may be configured to allow this but it is likely it will require the user to login before performing such an operation. The payment media advance process is described in more detail later.

Once the payment media has been accepted then the payment media change make up is either displayed or dispensed (step S630, FIG. 6). In the current invention the nature of the denomination split is determined intelligently and can utilize a similar decision process as described for the start find process.

More specifically the rule based process would be dependent upon the size of denomination presented. For example, a rule based approach may include the following criteria:

(1) If the amount of payment media calculated by the apparatus <=$50, then the given exchange amount is equal to all $1's;

(2) If the amount of payment media calculated by the apparatus >=$51 and <=$75 then the given exchange denomination distribution is equal to 5×$5's and the balance in $1's;

(3) If the amount calculated by the apparatus >=$76 then the even exchange denomination is equal to or up to 50×$1's, 5×$5's, up to 5×$10 and the balance in $20's;

(4) If the change request is an odd number, the denomination distribution is highest numbered rule above and $1's.

In addition to this action, the payment media handling apparatus may adjust the denomination distribution dependent upon its contents. For example, if the apparatus determines that is low on $5 bills, then it may adjust to dispense additional $1 bills or alternative higher denomination bills.

Alternatively, the store may wish to define its own change policy. Another alternative is to allow a remote entity/authority, such as a head office, to define the change policy. In yet another alternate embodiment, if the apparatus is electronically coupled, i.e., networked, to the payment media originating sources it would be possible to define change policy dependent upon information/knowledge of the real time store activity. Preferably, this may be done in real time or substantially real time. Using such a networked system, the apparatus could review what change is being utilized most heavily at which payment media originating sources and alter the change policy accordingly either for specific payment media originating sources or for all payment media originating sources.

Once the appropriate denomination split has been determined, the apparatus may dispense automatically or display the proposed split and ask the user to confirm their acceptance. If the user is given the opportunity to confirm/decline their acceptance of the proposed denomination split they may also be given the chance to redefine the denomination split prior to dispensing (step S640, FIG. 6). As for the Start Fund Process, a retailer may only want to allow a limited number of users to be able to redefine denomination split and as such, a user would need to log in and have the correct authority level. The method then continues to step S650, where the operation of the method stops.

Payment Media Advance Management

Figure 7:
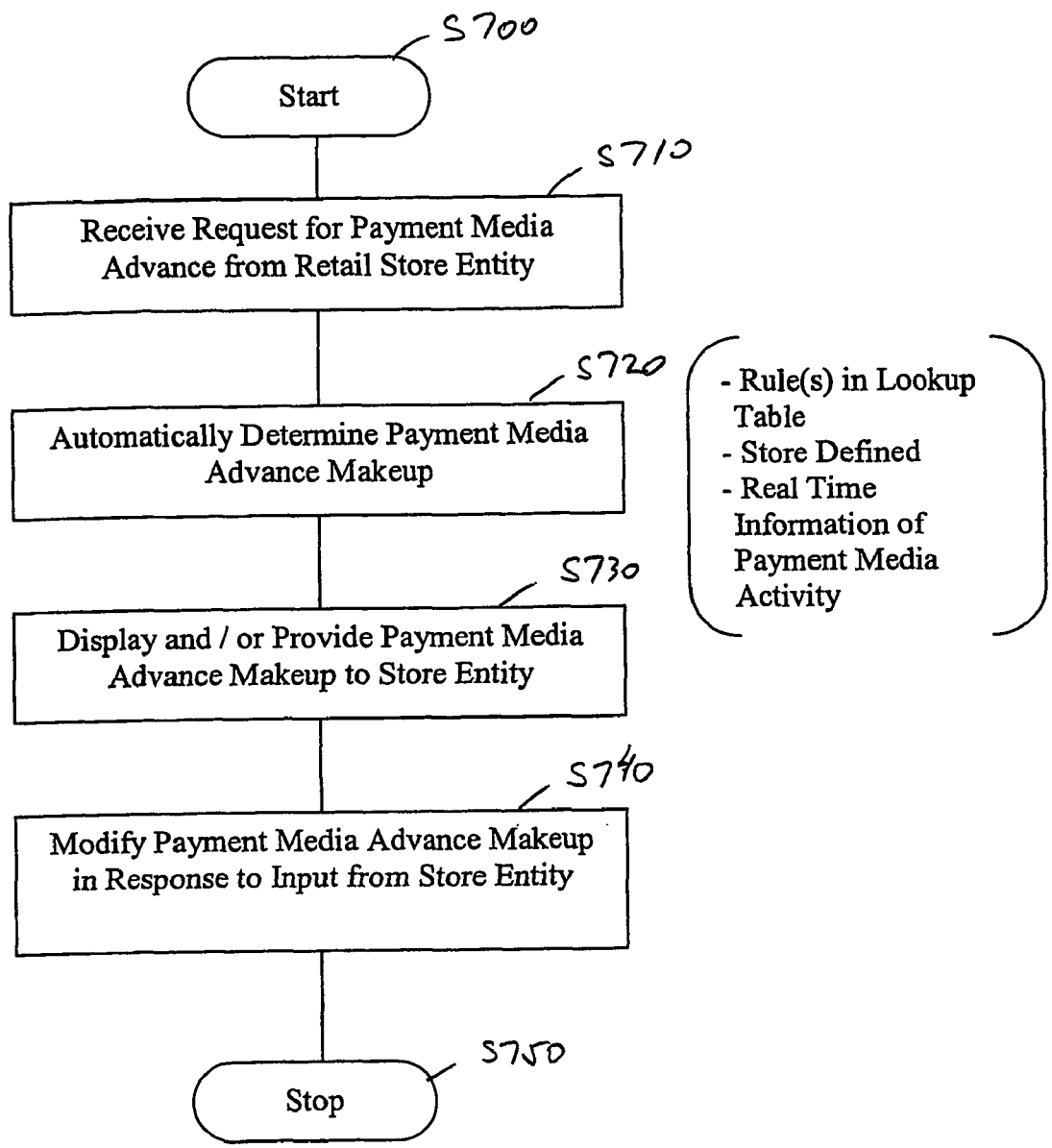
FIG. 7 is flowchart outlining one exemplary embodiment of a method of electronically processing a payment media advance operation according to this invention.

Another aspect according to this invention provides a means to electronically process a payment media advance either automatically or upon demand. An advance is the issuance of payment media to an entity, e.g., a specific individual supervisor, a start fund, a cashier, a payment media originating source, etc. FIG. 7 is flowchart outlining one exemplary embodiment of a method of electronically processing a payment media advance operation.

An exemplary embodiment of an apparatus that is used to implement the process shown in FIG. 7 includes a payment media handling apparatus having a payment media dispensing device and optionally a payment media accepting device. The payment media dispensing and acceptance devices may be combined within a single apparatus and further to this be capable of recycling payment media. The apparatus also has a user interface, the user interface may be a traditional PC with a keyboard and a mouse or other pointing means such as a touch screen. The interface provides the means by which the user can easily interact with the payment media handling apparatus. Typically, the first operation carried out by the users will be to login and identify either themselves, their payment media originating source or both themselves and their payment media originating source. Though this is preferable for security and auditing purposes, it is not essential to the current invention.

With reference to FIG. 7, in one exemplary embodiment, the user approaches the apparatus and requests a payment media advance (step S710, in FIG. 7). In the simplest form the apparatus will then prompt the users to indicate the value, denomination split and media type they require for the payment media advance. If the apparatus has required the user to logon or identify the payment media originating source it may make a decision as to whether it is acceptable to supply the value requested. For example the apparatus may be set to allow only one automatic payment media advance per day for any given payment media originating source. If a second payment media advance is requested a supervisor may be required to provide authorization.

In another exemplary embodiment, a more sophisticated apparatus would use a more complex rule based criteria to determine whether or not to dispense and also the value and split to dispense (step S710, in FIG. 7). The rules would be derived based on typical requirements associated with the retail store payment media operations.

In yet another exemplary embodiment, a more sophisticated apparatus would allow these rules to be defined by a policy provided by the store, or alternatively by a policy provided by a remote entity, as discussed above with respect to the payment media start fund management.

In a further exemplary embodiment where the payment media originating sources are electronically coupled/networked to the apparatus, then an automatic decision could be made as to the best value and denomination split for the payment media advance based on the day's trading activity or data built up over a period of time. Having payment media originating sources networked may also negate the need for supervisors to authorize multiple payment media advances. The payment media originating source would notify the user and the apparatus that it is short of particular funds and allow the payment media advance to proceed. Authorization may then be provided via remote means to other actions that the user may need to perform to complete the operation.

It will be noted that the systems and methods of this invention provide for supervisors and/or managers to issue payment media advance funds for multiple entities without having to log in each time. For example, a supervisor or manager, may leave his or her log-in in effect at an payment media management system funds dispensing machine provided only pre-approved cashiers are allowed subsequent access to the machine, until the supervisor's or manager's log-in is cancelled or the supervisor or manager logs off of the funds dispensing machine. As an alternative to logging-off, after dispensing of a payment media advance, a supervisor or manager may simply hit "cancel" thereby signing-off completely, without a separate log-off.

If the user defines the value, denomination and media type split it will issue automatically (step S730, in FIG. 7). Certain users can also define the time of day of issuance. Should the apparatus propose a denomination split the user may be given the opportunity to accept or decline. If the user declines they may be allowed to define their preferred value and denomination split dependent upon their level of authorization (step S740, in FIG. 7).

Moreover, the payment media management system can report and track register activity and implement business rules to govern functional capability, such as, for example, no cap on the amount of money in an advance.

In addition, the user may be issued with some form of receipt along with the payment media advance. The receipt may be stored in the payment media originating source or stored elsewhere and provides an additional physical audit of the transaction.

The systems and methods according to this invention may provide payment media advances from the safe portion of a payment media management system device to the dispensing portion of a payment media management system device and analyze the payment media advances in terms of denomination, time period during which the advances occurred, and by payment media type.

Bank Deposit Management

Figure 8:
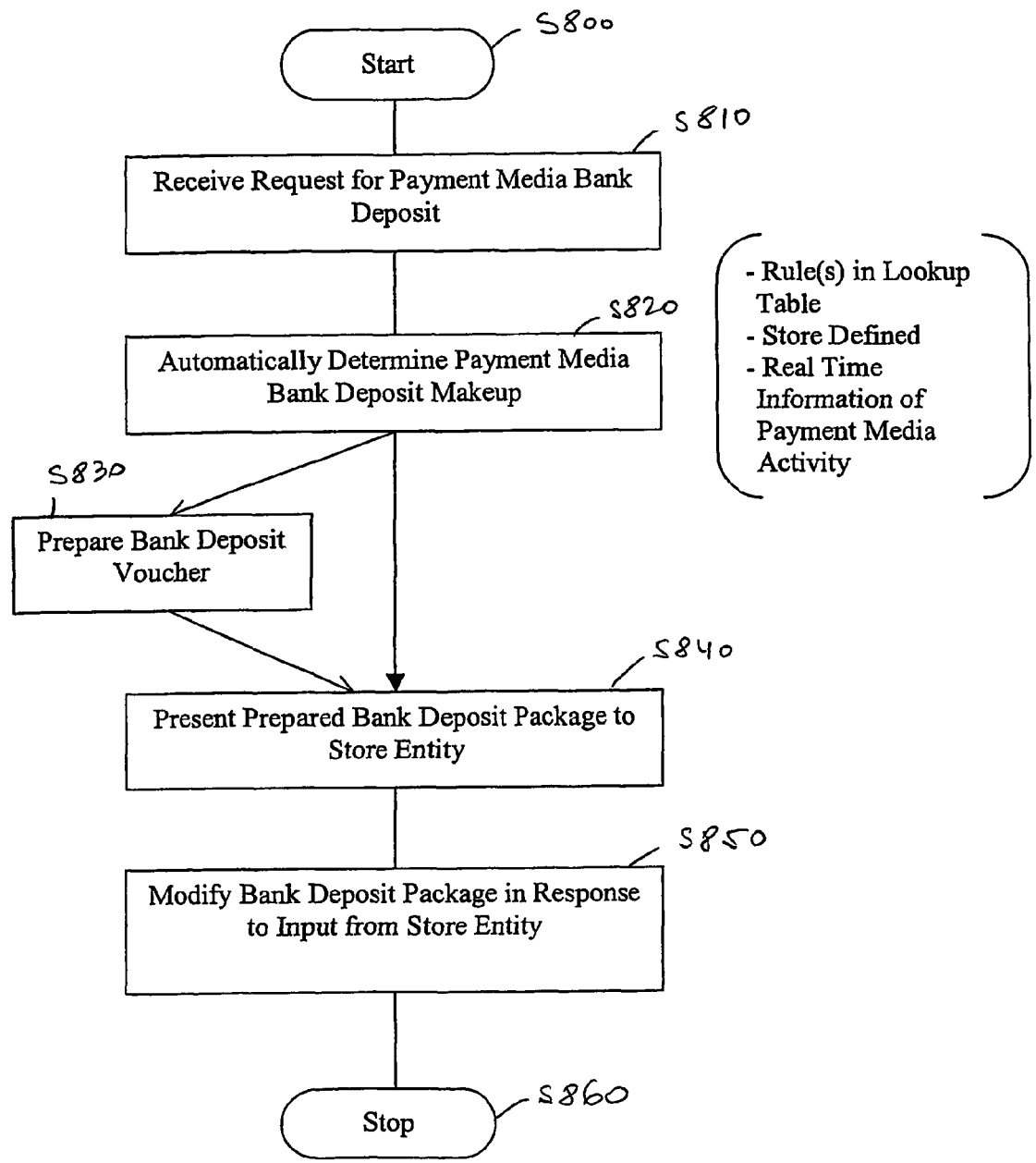
FIG. 8 is flowchart outlining one exemplary embodiment of a method of electronically processing a bank deposit operation according to this invention.

Another aspect according to this invention provides a means to electronically process a bank deposit either automatically or upon demand. FIG. 8 is flowchart outlining one exemplary embodiment of a method of electronically processing a bank deposit operation.

The systems and methods according to this invention permit printing of a deposit slip by the payment media management system machine at the ending of processing of a back deposit function. The deposit slip may contain a barcode or other machine or human readable identifiable marking at an end of the slip to comply with the bank's (or CIT, etc.) requirements. Another essential process required within the retail environment is the ability to make a bank deposit or more precisely withdraw funds from an apparatus for storage or transportation off site to CIT/commercial bank. Typically this will be done at the end of every day.

An exemplary embodiment of an apparatus that may be used to implement the process shown in FIG. 8 is a payment media handling apparatus having a payment media acceptance device and payment media dispensing device. The payment media dispensing and acceptance device may be combined within a single apparatus and further to this be capable of recycling payment media. The apparatus also has a user interface, the user interface may be a traditional PC with a keyboard and a mouse or other pointing means such as a touch screen. The interface provides the means by which the user can easily interact with the payment media handling apparatus.

Typically the first operation carried out by the user will be to login and identify either themselves, their payment media originating source or both themselves and their payment media originating source (step S800, in FIG. 8). Though this is preferable for security and auditing purposes it is not essential to the current invention. The user then makes the request to make a bank deposit via the user interface (step S810, in FIG. 8). As with previous examples it is preferable that the user does not have to worry about what the size of the deposit should be or what the denomination split should be. To this end the apparatus intelligently decides the value and denomination split of the deposit (step S820, in FIG. 8).

The bank deposit operation is achieved in a similar manner as the Start Fund process discussed above. Indeed it is very likely that the start fund process and the bank deposit process be interdependent. Whereas the issuance of start funds typically happens first thing in the morning the bank deposit process typically happens last thing at night.

The aim of the bank deposit is to remove as much payment media as possible from the payment media handling apparatus so it can be stored safely. However the retailer would like to retain sufficient funds within the payment media handling apparatus to be able to issue the start find the next morning. There is a fine balance between the need for security and the need for efficiency. The size of the bank deposit can be controlled using the techniques or methods described previously for the start fund process.

The most basic approach being the use of rules. The rules govern the value and denomination split of payment media to be retained within the payment media handling apparatus. For example it is usual for the retailer to bank all the high and unusual denominations every night e.g. all $100, $50 and $2 bills will be banked every night. Moreover, the payment media management system can display all current denominations held in a payment media management system machine miscellaneous bill receptacle along with a deposit profile of those bills.

This is a basic approach and it is more likely a retailer would prefer to retain more control over the bank deposit process. So typically a process that allows the retailer to define policy would be preferred. This would allow the retailer to modify the bank deposit if, for example, they were aware of a promotion running that would require an excess of $20 bills. By altering the bank deposit process and the start find process accordingly the store owner could account for this.

Alternatively, in some instances a remote authority may wish to control the bank deposit process, a retailer's head office for example. To enable this capability, the apparatus is electronically coupled via a communication network/communication link. This may include, for example, a dedicated connection, a closed network or a secure Internet connection.

In another alternative embodiment, the bank deposit may be defined by monitoring activity in the retail store. This is achieved by electronically coupling the payment media handling apparatus to one or more payment media originating sources, and using the data from the shop floor either real time or over a prolonged period. This data could then be used to determine the optimum bank deposit to allow for not only the start fund issuance but potential payment media advances and change requests running through the next day.

By monitoring the bank deposit process, it is possible to minimize the need to empty, deplete or restock the payment media handling apparatus. Also by minimizing the amount of payment media to be banked you reduce the associated costs of transporting, preparation and counting of payment media by CIT operators.

Once the apparatus has determined the preferred bank deposit, the user will be notified, or the dispense process may commence automatically. At this step, a bank deposit slip or voucher may be automatically prepared to be used in the payment media deposit operation (steps S830 and S840, in FIG. 8). If the user is prompted they may be given the opportunity to accept, decline or modify the proposed value and denomination split (step S850, in FIG. 8). As with previous examples, the ability to modify a denomination split and value will be very much dependent upon store policy and/or the user's level of authority.

When the notes are dispensed, they may be dispensed in a number of formats dependent upon user, store or head office policy. Preferably the notes will be dispensed in a format most suitable for the commercial bank or CIT to handle them subsequently.

For example the notes may be issued by denomination and in predefined amounts. Each defined amount or denomination stack may be provided with a header/footer card and/or banded. Header and/or footer cards are used by CIT and other major payment media sorting and counting centers to provide a variety of information about the notes to be counted and sorted. Typically the header is read just before feeding the first note of a stack and the footer just after feeding the last note in a stack. The information provided on a header may define the origin of the notes, the denomination to be expected, and the proposed value.

It is proposed that the dispensing device either contains a selection of header/footer cards or be capable of generating them automatically or upon demand. Typically the dispensing apparatus would be provided with a suitable means for transferring information. This information may be in the form of a barcode, 2-D barcode, RFID, Magnetic-stripe or any other form of data storage device that can be subsequently interrogated.

In addition or alternatively, the notes may be banded or placed directly into a secure container. The band or container may also be provided with tamper evident devices or be tagged as described in co-pending applications WO 0245042 and WO 03046845, each of which is incorporated herein by reference in its entirety.

It will be appreciated that payment media originating sources, which also include payment media registers, may refer to an entire payment media register and/or the money tray(s) inside of a payment media register. Payment media originating source deposits or payment media originating source collections may be identified as individual payment media originating sources or collectively, as a group of payment media originating sources, such as, for example, at a single location, e.g. in a single kiosk. The systems and methods according to this invention allow supervisors and/or other managers to perform multiple payment media originating source deposits without logging off or logging out when each individual deposit payment media originating source is made. The systems and methods according to this invention, however, may automatically log out cashiers who make payment media originating source deposits, as soon as the payment media originating source deposit has been made, thereby not permitting cashiers to make multiple payment media originating source deposits at all without logging off/out. The systems and methods according to this invention permit use of a number of different protocols for identifying payment media originating source deposits and/or bank deposits. This permits acceptance of different IDs for the same deposit. This might include, for example, permitting deposits to be made with or without a leading zero identifying number for a payment media originating source or other funds' deposit. The system also accounts for, and keeps track of unclaimed deposits, such as, for example, deposits made before logging in where the logging in process is delayed past a time allowed for logging in.

The systems and methods according to this invention also permit bank deposits to include checks. Information concerning checks can be provided to the payment media management system using a deposit slip, for example, and the bank deposit made by the payment media management system can include this check information, including amount of funds deposited by check, and in other payment media. Moreover, the bank deposit information can be specified in terms of sales date. Additionally, the payment media management system dispensing of bills may round down to the lowest number of straps that can be dispensed and dispense only full straps. The payment media management system manages strap thresholds.

Capacity Management

Figure 9:
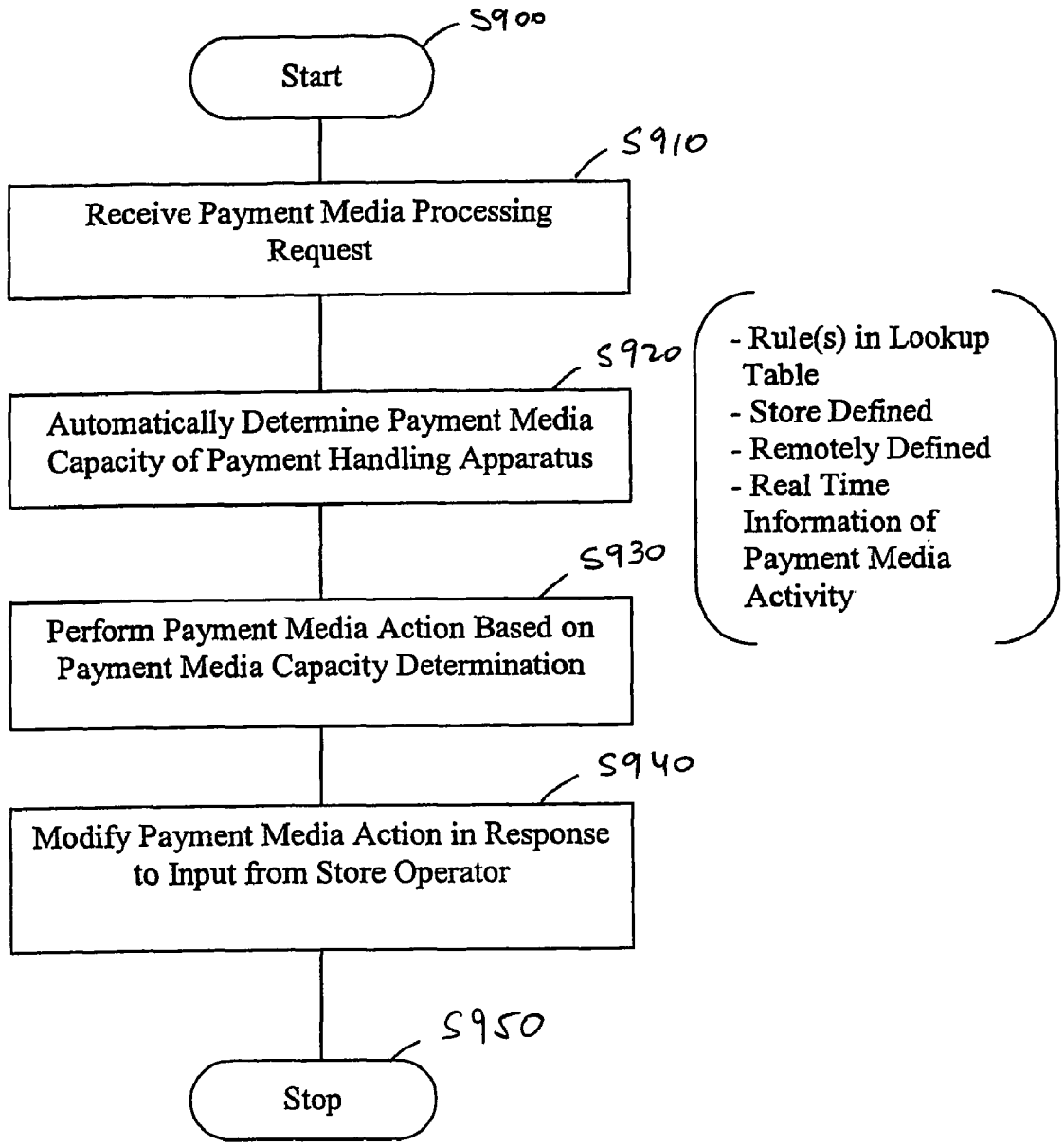
FIG. 9 is flowchart outlining one exemplary embodiment of a method of electronically managing payment media capacity of a payment media handling apparatus according to this invention.

FIG. 9 is flowchart outlining one exemplary embodiment of a method of electronically managing payment media capacity of a payment media handling apparatus. As discussed above with respect to the Payment Media Start Fund process and the Bank Deposit process, the ability to manage the capacity of the payment media handling apparatus is of key importance.

An exemplary embodiment of an apparatus that may be used to implement the process shown in FIG. 9 is a payment media handling apparatus having a payment media acceptance device and payment media dispensing device. The payment media dispensing and acceptance device may be combined within a single apparatus and further to this be capable of recycling payment media. The apparatus also has a user interface, the user interface may be a traditional PC with a keyboard and a mouse or other pointing means such as a touch screen. The interface provides the means by which the user can easily interact with the payment media handling apparatus. Typically the first operation carried out by the user will be to login and identify either themselves, their payment media originating source or both themselves and their payment media originating source (step S900, in FIG. 9). Though this is preferable for security and auditing purposes it is not essential to the current invention.

In addition the apparatus has a means for determining its capacity. This may be provided by a physical means such as a weight means measuring device, or by measuring the height of a stack of notes or any alternative. Alternatively capacity may be more accurately monitored by accounting means. For example where a recycling apparatus such as the TCR Twin Safe is used you have a precise knowledge of what has been put in so by default you know exactly what you can take out.

When a payment media processing event is requested by a user (step S910, in FIG. 9), the apparatus reviews its capacity and determines whether it is capable of meeting the users needs (step S920, in FIG. 9). The payment media management system also maintains an inventory and threshold levels which act as triggers to launch an automated ordering routine for additional funds by, for example, contacting a bank or CIT provider for change orders. In addition, banks and/or CIT providers may enter the system and provide such information to the payment media management system on an as-needed basis. In a preferred embodiment the process runs in parallel to the other processes herein described. By using look up tables, rules or analyzing payment media originating source behavior the apparatus can determine the most appropriate course of action. Furthermore, if more than one apparatus is present and they are networked either directly or via host a more versatile situation can be envisioned. Here if the apparatus at which the request was made is unable to meet the user's needs it may direct the user to another apparatus.

This handling of events works for both accepting and dispensing processes. For example if the user requests a start fund the apparatus will first review its contents and cross reference this to the preferred start fund. If sufficient funds are available the apparatus will dispense the preferred value and denomination split (step S930, in FIG. 9). If however the correct funds are not available the apparatus may dispense an alternative start fund, alert a supervisor or direct the user to another apparatus with the correct fund, or allow the user to modify the payment media action (step S940, in FIG. 9). One further alternative, though not preferred, is that the apparatus will dispense a part of the start fund and then direct the user to another apparatus to dispense the remainder of the start fund. If the payment media originating source and apparatus were networked the apparatus would be able to pre-empt the user's request and immediately direct them to another apparatus or alternatively alert a supervisor prior to the user's arrival.

Alternatively if the user wishes to deposit payment media originating source contents a similar process would take place. When the user identifies themselves the apparatus may make a decision based upon simple rules, store policy, remote policy or based upon real time payment media originating source activity as to whether to allow the user to try and enter the payment media originating source contents. For example, if from reviewing a look up table or rules, the apparatus determines that the average payment media originating source contents are usually in excess of its remaining capacity it may direct the user to another apparatus or request assistance from a supervisor. If the apparatus decides to try and accept contents but subsequently finds it does not have sufficient capacity, it may return all or some of the notes to be deposited in another apparatus. Alternatively, all the notes will be returned and assistance requested from a supervisor.

Typically the apparatus would review its contents both as an event is requested and just after. The advantage of analyzing contents both before and after an event will now be described in context of the Event Timing process.

Event Timing Process

Figure 10:
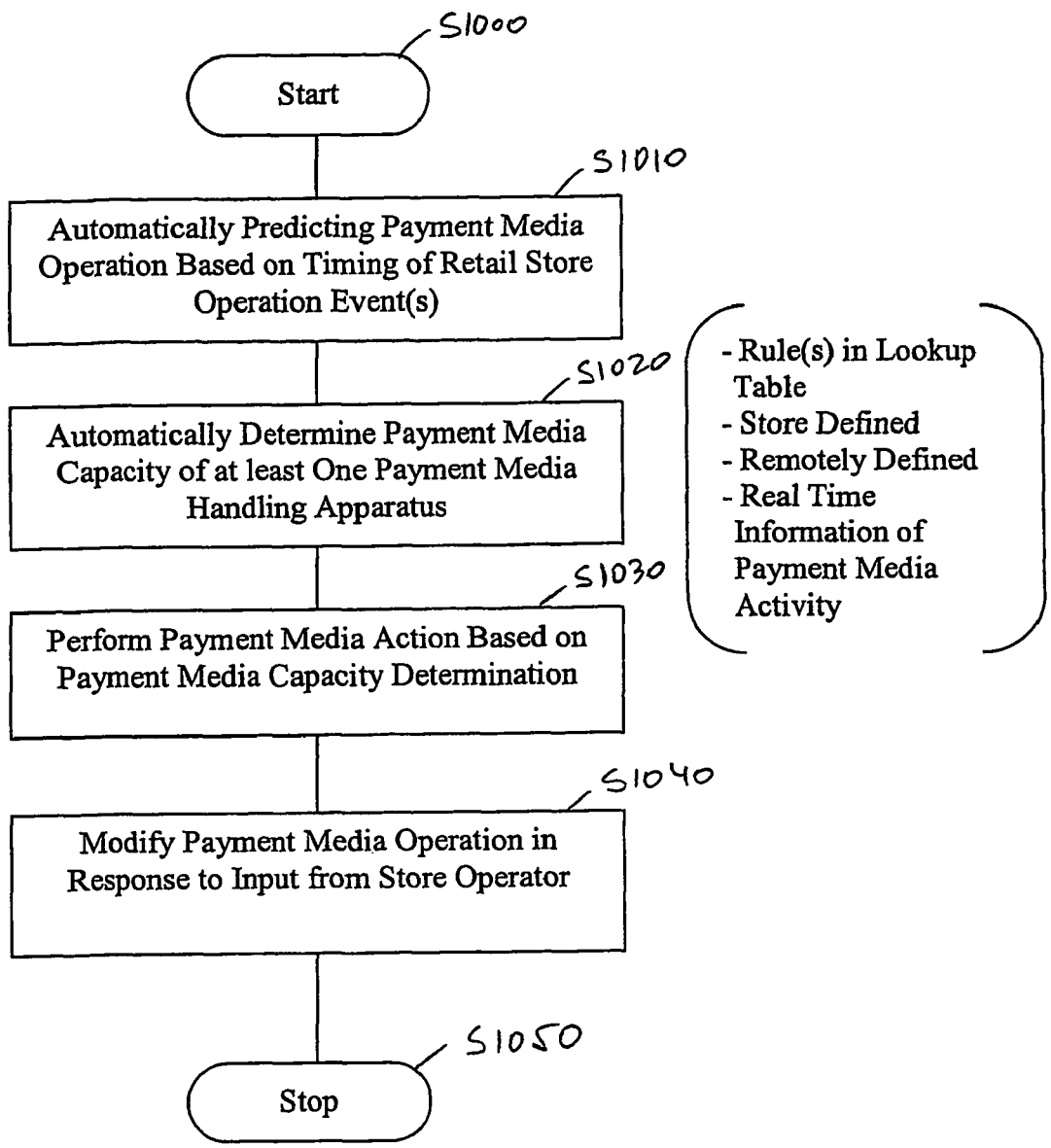
FIG. 10 is flowchart outlining one exemplary embodiment of a method of electronically predicting the timing of a payment media operation event according to this invention.

FIG. 10 is flowchart outlining one exemplary embodiment of a method of electronically predicting the timing of a payment media operation event. An exemplary embodiment of an apparatus that may be used to implement the process shown in FIG. 10 comprises a payment media handling apparatus having a payment media acceptance device and a payment media dispensing device. The payment media dispensing and acceptance device may be combined within a single apparatus and further to this be capable of recycling payment media. The apparatus also has a user interface, the user interface may be a traditional PC with a keyboard and a mouse or other pointing means such as a touch screen. The interface provides the means by which the user can easily interact with the payment media handling apparatus.

With reference to FIG. 10, typically the first operation carried out by the user will be to login and identify either themselves, their payment media originating source or both themselves and their payment media originating source (step S1000, in FIG. 10). Though this is preferable for security and auditing purposes it is not essential to the current invention.

In addition the apparatus is provided with a timing device, or is networked to payment media originating sources and other payment media handling apparatus, or is provided with both a network and a timing device. If the apparatus utilizes a timing device, it is also provided with information relating to the timing of key events where actions may be required. Such events include, for example, staff shift changes, opening and closing times, payment media originating source cashing up times, and the like.

By having knowledge of the timing of these events on a daily, weekly, seasonal or yearly basis, the apparatus can automatically predict payment media operations required (step S1010, in FIG. 10) and thus, it can anticipate periods of activity. Further to this the apparatus can predict the nature of the activity, for example a dispense process or an acceptance process and also the scale of that activity.

By having this knowledge the apparatus can review is capacity (step S1020, in FIG. 10) using the capacity management process previously described to determine whether it is likely to meet the needs of the users (step S1030, in FIG. 10). If for some reason the apparatus determines it may not have sufficient capacity or sufficient funds, dependent upon the type of event forthcoming, it will take action by alerting a supervisor or ensuring an alternative apparatus is capable of handling the forthcoming event (step S1040, in FIG. 10).

When the apparatus is networked to the payment media originating sources and other apparatus, the event timing process can be managed more effectively. By having a knowledge of exactly what is in the payment media originating sources the payment media handling apparatus can accurately determine whether it is capable of performing a payment media operation, for example, accepting the contents or supplying sufficient payment media for an payment media advance and/or payment media originating source float.

Using either the timing device or a network process the payment media handling device is in a much better position to anticipate and predict forthcoming activity and take steps to ensure no delay is caused to the users.

In an alternative embodiment the event timing process can be utilized to provide confidence in the integrity and security of the physical payment media and data associated with it while it is in transit. In the current context the transit or movement of payment media will be from the payment media originating source to the back office payment media handling apparatus.

When moving payment media from a first location to second location it usual to do this as quickly as possible to limit the exposure to potentially fraudulent or illegal activity. Furthermore it can be estimated approximately how long that time should be. For example in a large department store it may take 30 minutes or more from collection of the payment media from a payment media originating source until it reaches the back office and is counted into a secure environment. In a smaller retailer with fewer payment media originating sources and less floor space it may only take 5 minutes or less. In either scenario an approximate transit time is known. If, for whatever reason, the payment media takes in excess of the usual period of time to make the journey there is a greater risk that it has been tampered with or mishandled in some way.

The event timing process can be used as means to measure this risk and assess whether there may be a problem. For example the payment media handling apparatus knows, because of the event timing process, that a payment media originating source is due to be cashed up at a certain time, it also knows how long it should take the payment media originating source to 'cash out' and the contents to be moved from the payment media originating source to the back office. Further to this the payment media handling apparatus can know, approximately or accurately, what the value of those payment media originating source contents should be. If for some reason the value of the payment media originating source contents falls short by a significant margin and the payment media originating source took in excess of the estimated time to travel from the payment media originating source to the back office the payment media handling apparatus could be instructed to alert the user and a supervisor. The supervisor can then review the situation and make a decision as to whether the payment media originating source contents were indeed correct or further action needs to be taken. A suitable tolerance can be built into both the timing aspect and the value aspect to prevent the payment media handling apparatus from alerting too frequently. The rules governing the process could be very simple, as above, or more complex. For example the longer the delay between payment media originating source and back office the lower the discrepancy needs to be between estimated value and actual value received.

In a further enhancement, where the payment media originating sources are networked to the payment media handling apparatus, the actual EPOS data from the payment media originating source could be used to tell the payment media handling apparatus exactly how much payment media to expect. The payment media originating source would also notify the payment media handling apparatus that it is being cashed up and to expect the contents in a period of time. Even when such accurate data as to expected funds is available it is likely some tolerance will be built in to allow some variation from the expected amount. This will allow for the wrong change being given occasionally or other minor, accidental errors that will always occur.

In another exemplary embodiment, where payment media is transported from the payment media originating source with data associated with it, the payment media may be held in a secure container and associated with that container is a suitable data storage device providing detail on the value, denomination and potentially other EPOS data. Such a situation is described in more detail in co-pending applications WO 0245042 and WO 03046845, each of which is incorporated herein by reference in its entirety.

As the payment media is stored securely and the value and denomination data available, it is possible to avoid the need to recount the payment media. However the user has to trust that both the physical and data has retained its integrity. Obviously, as before, the longer the secure container is not in a secure environment, such as being carried across a shop floor, the longer it is exposed to risk. If the container is transported from the payment media originating source to the back office within the allotted time the payment media handling apparatus will trust the data and will not request the payment media be counted again. The container can then be stored securely in a safe area. Upon acceptance of the valid data the payment media handling apparatus will update the data file to indicate that the payment media has been accounted for and stored securely. If however the payment media is not presented within the prescribed time limit the payment media handling apparatus will request the payment media be counted again. If the value is correct the data file will be updated and the payment media taken for secure storage. If the value is wrong a supervisor will be alerted and further action taken as required. The inventors recognize this application has wider value beyond the retail environment.

Exception Reporting and Handling

Figure 11:
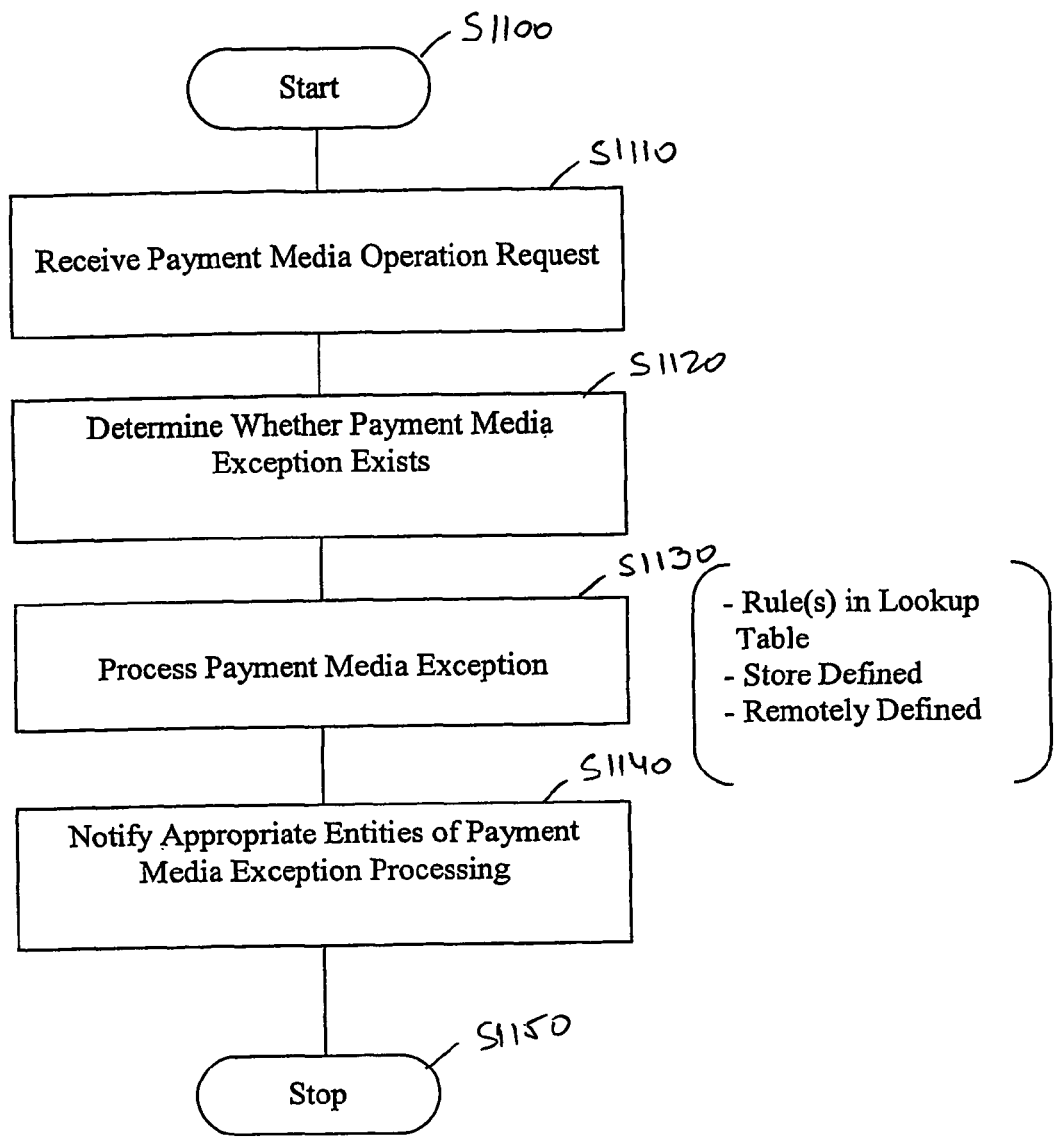
FIG. 11 is a flowchart outlining one exemplary embodiment of a method for exception reporting and handling process according to this invention.

FIG. 11 is a flowchart outlining one exemplary embodiment of a method for exception reporting and handling process. As with all environments where money is being exchanged there inevitably will be some instances where payment media is accepted which is not in a fit state or condition to be handled by payment media handling apparatus. There are a number of reasons why payment media may not be accepted. These include counterfeits, heavily soiled, damaged or old issues of notes without the modern machine readable features. In some countries, old notes are not taken out of circulation until they cease to be fit for use. It is therefore essential that any payment media handling process and apparatus are capable of dealing with and accounting for rejects.

An exemplary embodiment of an apparatus that may be used to implement the process shown in FIG. 11 comprises a payment media handling apparatus having a payment media acceptance device and optionally a payment media dispensing device. The payment media dispensing and acceptance device may be combined within a single apparatus and further to this be capable of recycling payment media. The apparatus also has a user interface, the user interface may be a traditional PC with a keyboard and a mouse or other pointing means such as a touch screen. The interface provides the means by which the user can easily interact with the payment media handling apparatus. Typically, the first operation carried out by the user will be to login and identify either themselves, their payment media originating source or both themselves and their payment media originating source (step S1100, in FIG. 11). Though this is preferable for security and auditing purposes it is not essential to the current embodiment. Further to this it is preferable that if a login process is utilized it is done so in accordance with the third embodiment of the current invention.

If a payment media exception or rejection is found during the payment media acceptance process (steps S1110 and S1120, in FIG. 11) the user is notified and the reject returned (step S1130, in FIG. 11). Alternatively though not preferably all the notes maybe returned. The user may then be prompted to re-enter the reject and, if the reject is a note, may also be advised to flatten the note or fold back any bent corners prior to re-entering the note. It is more usual within a retail environment for any rejects to be immediately dealt with separately in order to save time. The reject is typically placed in an envelope and then placed in a secure drop box.

Further, an enhancement would include having the envelope that is issued from the apparatus be provided with information/data relating to the user, payment media originating source, time, and transaction data so its contents may be traced back. This data may be provided in a machine readable format such as a bar-code, 2-D Bar-code or radio frequency identification device (RFID).

If a reject is handled separately, then dependent upon the user's authority, the user may be allowed to make a decision on the denomination and validity of the note and value balance the transaction manually. More typically such an action will not be allowed for most users, and thus only the payment media originating source contents accepted by the apparatus will be tallied.

Alternatively, the user may be allowed to value balance based upon other criteria apart from their level of authorization. For example, the store may set a policy with rules allowing employees to value balance up to a given level, say $20. So long as the discrepancy falls within $20 the user is allowed to proceed. If the discrepancy is greater than $20 a supervisor may be notified (step S1140, in FIG. 11) or the event logged for cross-referencing subsequently. If the apparatus produces the envelope it could be provided with the data as before plus details of the suggested denomination.

In another exemplary embodiment, the methods and systems of electronically managing a payment media exception may be used to manage/process events not related to the payment media originating source or condition of payment media. For example, the method and system may be used in situations where the payment media handling apparatus itself is unable to process the payment media for reasons such as, the apparatus is full and thus cannot accept payment media, the user has already made a payment media deposit/withdrawal and is only allowed to make one of such operations in a day, the user and/or payment media originating source has been identified as a high security risk for some reason and needs to be monitored, and other such reasons. Relevant reports can also be produced and logged for the information of necessary personnel.

Once a payment media exception or event has been identified, various actions may be performed. For example, if a note is found to be too damaged to process, a decision will be taken as to what to do with the note. The decision may be based on the value of the note and the user handling the note. If the note is of a high value and/or the user is considered a high risk additional actions might be required beyond logging the event. For example the apparatus may prompt security cameras to focus on the user handling the note, or the supervisor might be alerted. The supervisor may be alerted by email, fax, pager, SMS text message, phone, or by some other audible or visual alerting system. The user may also be made aware that a supervisor or security cameras have been altered as a form of deterrent.

Simultaneous Count and Login

Another aspect according to this invention provides methods and systems that enable a payment media count operation and a login operation to be performed in parallel, i.e., simultaneously.

Figure 12:
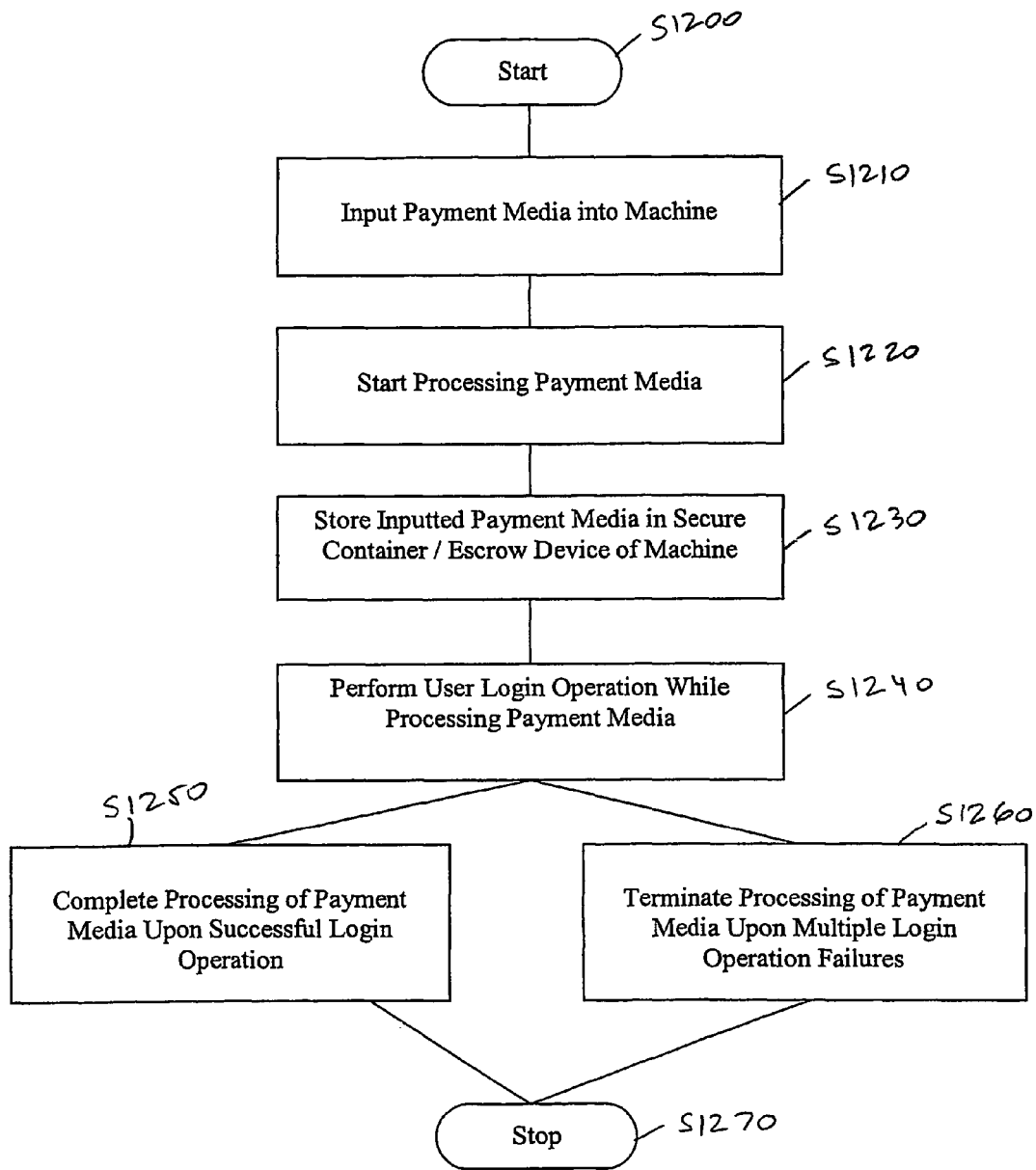
FIG. 12 is a flowchart outlining one exemplary embodiment of a method of performing a payment media counting operation and a login operation according to this invention.

FIG. 12 is a flowchart outlining an exemplary embodiment of a method of performing a payment media counting operation and a login operation. The exemplary embodiment of an apparatus that may be used to implement the process shown in FIG. 12 comprises a payment media handling apparatus having a payment media acceptance device and optionally a payment media dispensing device. The payment media acceptance and dispensing device may be combined within a single apparatus and further to this be capable of recycling payment media. The apparatus also has a user interface, the user interface may be a traditional PC with a keyboard and a mouse or other pointing means such as a touch screen. The interface provides the means by which the user can easily interact with the payment media handling apparatus.

As indicated previously, generally, the first operation undertaken by a user is to login (step S1200, in FIG. 12). However, this process takes time and delays the payment media acceptance process.

In various exemplary embodiments of the systems and methods according to this invention, as soon as the user places payment media on to the payment media acceptance device (step S1210, in FIG. 12), the payment media is received, validated, counted and stored (step S1230, in FIG. 12). While this process is occurring the user logs in (step S1240, in FIG. 12). If the login process is successful the payment media is retained and the user notified that the process has been successful (step S1250, in FIG. 12). If the login process fails the user will be prompted to login again. If the user continually fails, for example three failed attempts are made, the payment media is returned (step S1260, in FIG. 12).

Dependent upon the configuration and nature of the apparatus the payment media may be held and returned in a number of ways. If a note acceptor and a note dispenser are used then it is preferable the notes are held in a physical escrow prior to final acceptance upon successful login (step S1220, in FIG. 12). If login is unsuccessful the same notes are returned from the escrow to the user.

Alternatively it would be possible to accept all the notes into an acceptor device and then return different notes upon a failed login from a dispenser. Though possible, this is not a preferred approach as it presents the opportunity for an unscrupulous employee to 'launder' invalid notes.

If a recycling apparatus is used, there are also two options for returning the notes. First, a physical escrow could be used to hold the notes as before only making final acceptance upon successful login. Alternatively, as is the case for the TCR Twin Safe, the notes are accepted and stored in the machine. If a login attempt fails, the same notes are returned from the payment media handling device back to the user. As the notes are issued on a last in first out basis, there is confidence that the device/method returns the same notes. In all cases, the notes are not credited to the accounting software until a successful login has taken place.

The inventors have also recognized that this functionality could also be used for other processes. For example, if a store has a policy not to return heavily soiled notes to its customers the apparatus could be used to accept soiled notes and return more suitable notes. This would be achieved by feeding soiled notes into a spare storage area. Typically such a storage area already exists for high or unusual denominations of notes. Typically this additional storage area will not be used for reissuing notes during the day and only emptied at the end of the day for bank deposit purposes. Once the soiled notes are stored clean notes would be issued from the appropriate storage area.

One important advantages of allowing a user to login and count simultaneously is the reduction in time spent at a machine. This is particularly beneficial at the end of a shift or trading day when multiple users may wish to deposit payment media originating source contents. All the time the users are waiting to deposit their payment media originating source contents the retailer is paying them. In addition, any delay in getting the payment media originating source contents into a secure location is increasing the exposure to risk of fraudulent activity or theft. It is very much in the retailer's interest to count, reconcile and store the notes as rapidly as possible.

Audio/Visual Clips

Another aspect according to this invention provides methods and systems that provide information helpful in managing various events associated with the payment media handling device or events associated with one or more payment media operation tasks.

Figure 13:
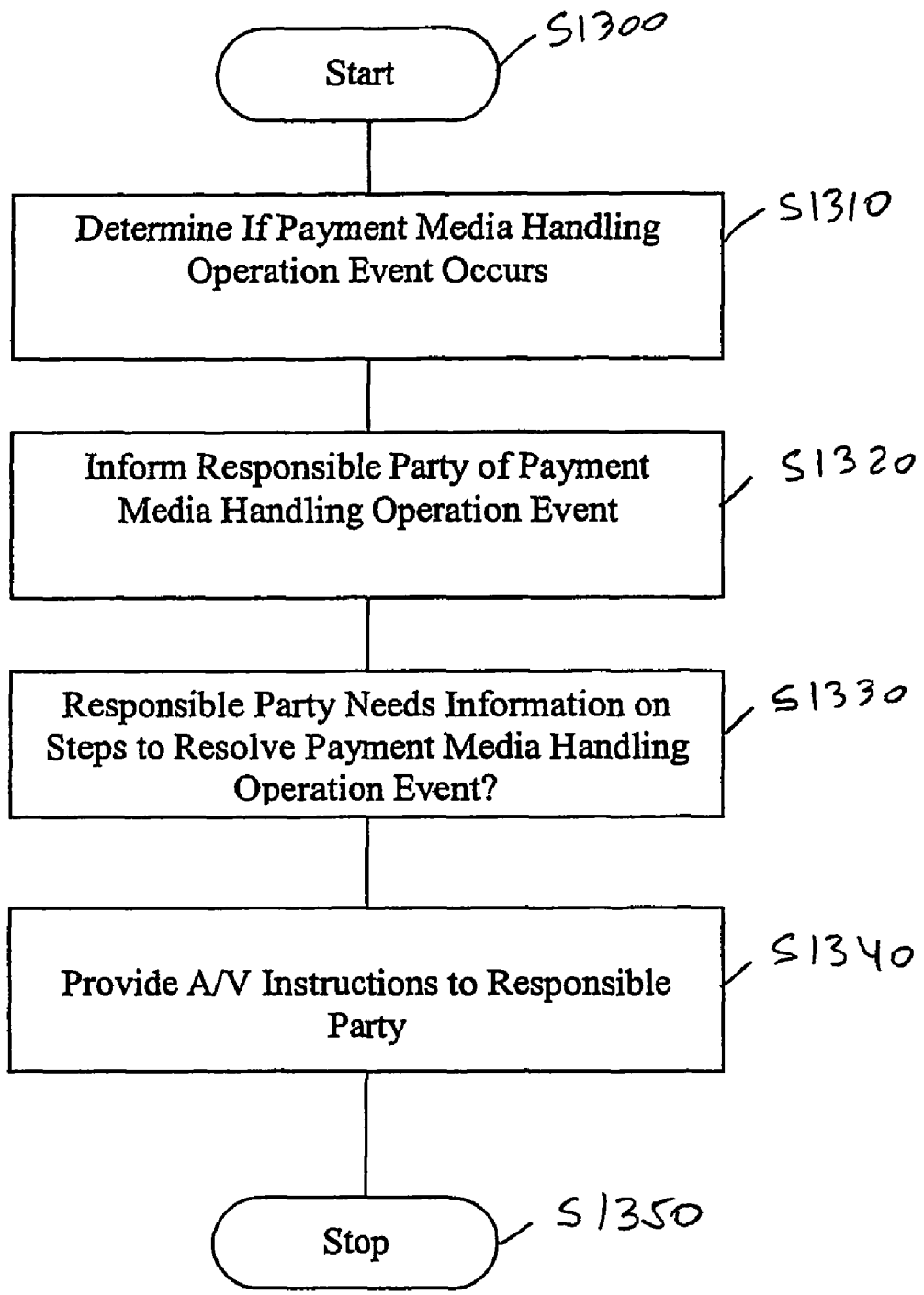
FIG. 13 is a flowchart outlining one exemplary embodiment of a method of providing information for payment media handling apparatus events and/or payment media operation events according to this invention.

FIG. 13 is a flowchart outlining an exemplary embodiment of a method of providing information for payment media handling apparatus events and/or payment media operation events. An exemplary embodiment of an apparatus that may be used to implement the process shown in FIG. 13 is a payment media handling apparatus comprising a payment media acceptance device or a payment media dispensing device or optionally both. Where both are present the payment media dispensing and acceptance device may be combined within a single apparatus and further to this be capable of recycling payment media. The apparatus also has a user interface, the user interface may be a traditional PC with a keyboard and a mouse or other pointing means such as a touch screen. The interface provides the means by which the user can easily interact with the payment media handling apparatus.

Typically the first operation carried out by the user will be to login and identify either themselves, their payment media originating source or both themselves and their payment media originating source (step S1300, in FIG. 13). Though this is preferable for security and auditing purposes it is not essential to the current invention.

In an exemplary embodiment, apparatus errors may occasional occur due to paper jams, misfeeds, double feeds etc. Should an error occur (step S1310, in FIG. 13), the apparatus identifies the error and refers to a look up table to find the correct error message to display to the user (step S1320, in FIG. 13). In the exemplary embodiment it is envisaged that the retailer be allowed to modify the error messages to a limited extent to make them more user friendly. Such alterations would include changing the language of a message, the text of a message or providing details of where a user may find assistance internally. The error message may be modified by a supervisor in store or may be controlled by a remote location, such as a head office or even the apparatus supplier.

Once identified the error message will be displayed, the user notified and provided with instructions for remedial action. The inventors have recognized that the provision of error messages can be vastly improved if an audio description is provided along with the visual diagram. Invariably when an error occurs the user is required to open the machine to access the internal mechanism. Once the user is attempting to deal with the error invariably they are unable to see the visual error message and the only way to see if it has changed is to return to the display. If an audio message is played in combination with the visual message the user can hear when the message has changed and will also hear the next set of instructions (step S1340, in FIG. 13). This allows the user to handle the error more rapidly and reduce the down time associated with the machine.

If the machine detects that the error cannot be dealt with by a user and may require an engineer the user is notified of this. Optionally, the apparatus may dial up the engineer or a call center and automatically notify them of the error and request assistance.

In another exemplary embodiment, the methods and systems according to this invention provide information that instructs an individual on ways to manage payment media handling apparatus events that occur when the payment media handling apparatus is electronically coupled to another electronic device, such as a personal computer (PC), a portable device assistant (PDA), a memory stick device, a printer and the like.

For example, when the payment media handling apparatus is electronically coupled to another electronic device, the systems and methods according to this invention provide for an audio/visual (AV) clip to appear (step S1340, in FIG. 13). This is much like the home PC automatically recognizing a new printer or peripheral. The AV clip would provide instructions on operation or further steps required to configure the apparatus. Prior to the AV clip playing the user would be prompted to indicate whether or not they wish to view the clip (step S1330, in FIG. 13).

In yet another exemplary embodiment, the methods and systems according to this invention provide information in form of AV clips that could be available, i.e., accessed, as part of the help menus on the payment media handling apparatus. In this exemplary embodiment, a user can call up an AV clip for assistance with any aspect of operating the machine.

In a further exemplary embodiment, the AV clips under the help menu might be used to provide information for events that are not specific to the payment media handling apparatus. For example, the AV clips may be used to provide guidance on the overall process of handling payment media within the back office. That is, for example, a user has completed a first operation, such as, for example, counting coin, and is unsure what to do next. The user could request help and AV clip would demonstrate that the next step is to place notes on to the payment media handling device, i.e., TCR Twin Safe, for counting.

The systems and methods according to the invention also involve methods, including pre-programmed error detection and correction schemes, user interface menus, scripts for guidance to facilitate overcoming malfunctions of payment media management system devices, as well as communication of malfunction status to responsible parties, e.g., police officials, maintenance technicians, supervisors, customers, etc. Device jams and other malfunctions can be detected and appropriate self-diagnostics and self-correcting actions taken, as well as the showing of slide shows and/or videos instructing users what actions to take to remedy and/or circumvent the malfunctions.

For example, a slide show or video may indicate to a user that when a jam occurs, the already dispensed finds must be re-inserted into the payment media management system machine before another advance will be dispensed, and can indicate what authority level a user needs to be advanced more funds. Additionally, notification of maintenance personnel, security personnel and others may also take place. Moreover real-time notification and advisories are provided by the payment media management system to store management and third parties regarding current balance, forecasted balance, requests for action such as, for example, requests for replenishment of a payment media management system machine, bank deposits and any other events and items which need attention.

Reports, Audits, and Safe Counts

The systems and methods according to this invention may prepare, save, report and communicate Payment media management system inventories, audits, safe counts and similar activities. Inventory, audit, safe count and similar activity data can come from a variety of sources, including the payment media management system machine deposit slip information, and can be tracked by the payment media management system. For example, the payment media management systems have the ability to keep track of rolls of coins and loose coins as well as bills. Methods may account for an emergency fund as part of a payment media management system safe report, including find analysis by denomination, period during which the funds were acquired, and/or dispensed, and by media type. Payment media management system may also account for both roll and loose change at any time within the payment media management system devices. The payment media management system may also prepare daily activity reports (DARs) for all payment media management system machines which report on, among other things, starting inventory, start funds, deposits, bank deposits, safe inventory purges, payment media advances, payment media advance cap management, manual entries by users, etc. The reports may show these reported parameters by transaction, and a present a summary that shows accumulated payment media advances after each transaction.

Safe Inventory Reports may also be prepared which show safe inventory by denomination, including the value of the notes (bills) and the number of notes (bills) in a note/bill storage unit which may be, for example, a Roll Storage Module (RSM), cassette, cartridge, envelope, etc. A typical safe inventory report shows an initial payment media management system machine inventory, an inventory of the notes dispensed, and an inventory of the funds remaining after finds have been dispensed.

Typically, in an exemplary embodiment, a payment media management system payment media dispenser may have eight roll storage modules, each with a particular identification, e.g., roll storage module n, where n=1 to 8. Such reports can show the number of notes per denomination in the payment media management system machine and/or the number of notes in each RSM or other receptacle or container, which may be a modular container.

Add-to-Inventory Reports may also be prepared that show what denominations and value of each species was added to the TCR Twin Safe inventory. The Add-to-Inventory reports may also indicate money placed in the payment media management system machine that is not associated with any register or payment media originating source.

Moreover, the payment media management system can take a real-time snapshot showing the contents of the payment media management system machine (e.g., TCR Twin Safe) and report that snapshot individually, or collectively with other snapshots taken throughout a given period of time.

Also, Purge/Empty Device Reports and Capacity Management Reports and/or Stock/Supply Reports may be generated. In a purge/empty report, typically performed late in the day, the system may determine, for example, the number and type of payment media notes in the payment media management system machine, how many are expected, how much room is left to accommodate bills, per denomination, and to suggest what bills to withdraw to avoid an overflow. For example, the payment media management system may determine that there are 700 bills in the overflow receptacle and suggest that the overflow be purged. A Stock/Supply report is somewhat the reverse of a purge/empty report in that the system determines the number and denomination of notes that are needed to fill the needs of the store's payment media originating sources and other units, e.g., refund desks, determine what bills are in the payment media management system machine at the start of the day, including, for example, the value and number of notes (bills) in each RSM (Roll Storage Module) that was purged purged/emptied previously, and put in what is needed. It should be noted that a roll storage module may include a roll of material, e.g., mylar, and bills/notes are stored between layers of the mylar. The payment media management system can make localized and/or global corporate payment media management system machine capacity forecasts.

Among the audits performed by the payment media management systems and methods is a Central Sales Audit which is performed at a central location, and typically obtains information from a point of sale unit. Central Sales Audits like other audits, may be sent to local and/or remote management as a loss prevention tool. Moreover, any audit report or other report generated by the payment media management system may be retained in a particular payment media management system for a specified number of days and then backed up and or sent elsewhere for further storage. The payment media management system may be programmed to backup and purge reports and audits on a periodic basis. The payment media management system may be a centrally located system and perform backups for other payment media management systems.

Iformation gathered by the payment media management system is used in the central sales audit. Data used in the Central Sales Audit includes data concerning every funds transfer, and every entity associated with that transfer, including deposit made from the same team member/cashier along with the time of day each deposit was made. Such data also includes status reports such as, for example, which payment media management system receptacles are full or empty, near full, or near empty. This data is also used in Audit Trail Reports, which shows details about every deposit and other funds transfer made by every entity (which includes people, registers, payment media originating sources, etc), including the time of day of the transfer. The payment media management system also prepares a daily activity report (DAR) for the payment media management system which includes data concerning starting inventory, start funds, payment media originating source deposits, bank deposits, safe inventory purges, safe inventory stockings, advances, cap management, manual entries made, etc. The daily activity report shows activities by transaction type, time made, by what entity made, and gives a summary of activities by transaction.

Payment Media Management Database Information

The systems and methods according to this invention also include preparation and saving of desirable payment media management information, such as, for example, lists of legal payment media originating sources or payment media registers, and/or active and inactive registers, for one or more retail operations, lists of breakdowns of money denominations and species that make up CIT (e.g., armored car) and/or bank deposits; starting inventories of payment media originating sources; lists of POS transactions associated with payment media originating sources; legitimate sales dates; special sales dates; etc. A validated list of registers or payment media originating sources, for example, would permit payment media management system methods which "allow" or "disallow" certain transactions such as, for example, case withdrawals or start fund allotments, or transactions made on "closed" business days, or after-hours transactions. Funds may be tracked by cashier and/or register and provides a method to promote cashier accountability. A Point of Sale feed to the payment media management system can provide data such as, for example, the amount of money that needs to be deposited by a certain payment media originating source or cashier, which is useful in providing this tracking. Additional payment media management information may include point of sale (POS) feeds for cashier accountability. This, for example, would provide a feed from a point of sale terminal to the payment media management system to determine an amount of currency that needs to be deposited for each register or payment media originating source. Additional payment media management information may include a breakdown of mixed currency denominations during a bank deposit, e.g., showing on a payment media management system device user screen. Additional payment media management information may include every payment media originating source deposit made from a user, including the time of day the payment media originating source deposit was made. Such information can also include an inventory having a breakdown of mixed bank denominations, usually kept in the overflow container or receptacle, e.g., RSM, during performance of a bank deposit function by a payment media management system machine.

Plural Machines, Plural Operations

The systems and methods according to this invention may involve management of more than one retail operation within a given store, e.g., grocery and clothing operations in a single store, by a single payment media management system, and/or management of more than one retail store, e.g., closely situated stores, by the same payment media management system. Moreover, the systems and methods according to this invention provide for using multiple payment media management system machines and/or systems in a single retail operation or store, as well as using a single payment media management system and/or machine for plural retail operations or stores, or floors or other units, physical or operational, within a given store. The systems and methods of this invention may provide a single system that maintains the integrity of inventory for more than one retail store or more than one type or retail operation in the same store.

Enhanced Communications

The systems and methods according to this invention provide enhanced network communication functions among payment media management system machines, safes, front offices, back offices, remotely located personnel and operations; auditing trail communication, supervisory notifications, etc. A payment media management system supports connectivity to other systems within the retail business or armored car or any other third party's business, and permits publication of payment media management data electronically via local area networks, wide area networks, intranets, internets, intranet and extranet connections that enable the payment media management system to update payment media-office and/or payment media-management system(s) launched manually or automatically. For example, the payment media management system may have bank deposits of $500.00 that are reported to management, or to a third party, such as, for example, a CIT; or the machine can be accessed by payment media originating source accounts, bank deposits, and can be tapped for funds issuing events, such as, for example, payment media originating source funds and floats.

Whereas a single computer may be used for the payment media management system and payment media-office and/or payment media-management system(s), multiple computers may be connected to one another as part of an payment media management system. A centralized dedicated audit computer may be used with the interconnections mentioned.

Furthermore, with networked computers, a supervisor can be contacted over a network, although supervisors can be contacted in other ways, e.g., telephone (wired and/or wireless). Moreover, with payment media management system network connectivity, reports generated by any computer connected to the network(s) can be distributed to and/or accessed by other computers on the network. For example, payment media management system reports can be copied to a central server and/or data repository to allow reports to be retrieved and/or viewed online.

Any reports can also be accessed online. For example, the payment media management system reports can be copied to a central server and/or data repository to allow reports to be retrieved and viewed online.

Networking also permits electronic connections with other systems including, for example, point of sale (POS) systems, payment media management systems, payment media offices, CITs (e.g., armored car services), sales audit systems and loss prevention systems.

Networking also permits real-time notifications and advisories to be sent to store management and third parties regarding current balance, forecasted balance, and requests for replenishment and back deposits, overflow prevention, as well as any other events requiring attention, as needed. For example, the payment media management system can proactively communicate with a member of management when all or part of a payment media management system machine becomes full. This notification can tale place using any suitable communication technique(s) or system including, for example, a page, SMS, RF, fax, e-mail, etc. Additionally, payment media management system machine openings can be reported, and predetermined individuals can be notified using any suitable communication technique(s). Also, the payment media management system can call a bank or CIT provider for change orders, and those third party entities can communicate with the payment media management system. The payment media management system also provides for confirmation of all bank and CIT deposits using suitable communication technique(s). Communications can take place with entities and items in the payment media management system as well as outside of the payment media management system.

Within some larger retail establishments, in addition to their own retail activities, other concessions may be present. Such additional concessions include, for example, children's rides, dry cleaners, photo processing, coin counting and exchange facilities, small shops etc. Such concessions are typically much smaller than the retailer and turn over smaller volumes of value media, e.g., payment media.

It is not always in the interest of such small retailers to invest in payment media counting equipment and they will typically count and reconcile takings manually. In the case of coin counting and exchange facilities, the deposited coin is often collected on a regular basis by a third party. A similar and equally applicable situation to that described above includes the example of a mall or shopping centre having a single "back office" facility that numerous small or large retailers can use.

The systems and methods according to this invention provide for a much more efficient reuse of the coin or other media generated by the various concessions and the retailer, and obviate any additional strain put on back office activities. The systems and methods of the current invention utilize the counting of multiple third party media and management of multiple third party media fund requirements in addition to that/those of the retailer.

In one exemplary embodiment of the systems and methods of the invention, when a third party wishes to deposit/obtain funds etc., the third party may be required to login and identify themselves, such as, for example, by using a PIN number, smart card, magnetic stripe card, or other suitable means. Once logged in, any third party transaction is reconciled against that party's account. Following the transaction a receipt may be issued to the third party, which shows the nature and value of the transaction. Such a receipt may be issued by any number of means including, but not limited to, one or more of a physical printout, an email, fax, or other type of report.

A third party may carry out any of the transactions described previously such as making deposits, obtaining start funds, obtaining change etc. By using the fund media more efficiently for both the retailer and one or more third parties, the systems and methods according to this invention may reduce the need for, or number and/or sizes of, payment media collections and deliveries by CIT. This benefits both the retailer and the third parties.

Additionally the retailer may impose a service charge to the third parties, such as, for example, concessionaires, for allowing them access to the retailer's "back office" facilities. The payment media management system can be programmed to provide such features. Thus, the retailer gains benefit from both the cost savings due to increased efficiency and a new revenue source.

Moreover, third parties depositing additional funds media include members of the public making a deposit into their bank accounts. The systems and methods according to this invention provide for customers to make their deposits at the point of sale or in a retailer's "back office". For example, one exemplary embodiment of the systems and methods of the invention provide for a customer to pay checks or payment media into their personal bank account(s) while they pay for their goods at a point of sale device or payment media originating source. In one exemplary embodiment, in order to do this, the customer may be required to identify both themselves and the details of their bank account. In one exemplary embodiment, this step is performed using a bank account deposit slip and/or by presenting a bank account card.

Deposited checks and/or payment media may be stored along with any other finds media in the payment media originating source. The electronic point of sale (EPOS) data in the payment media management system retains details of the transaction and ensures that the customer's account is credited with the correct amount.

In another exemplary embodiment, the traditional payment media "back office" is made directly or indirectly accessible to the customer who can then interface directly with "back office" funds dispensing/collecting apparatus. A user may be required to log in via a PIN number, or bank account card, in much the same manner as the retailer would. The login process identifies the users and their banking details and enables the user's "back office" transaction to be reconciled against their account(s). A user who carries out a "back office" transaction may be issued a receipt, as before. The "back office" apparatus may have one or more interfaces for public use and one or more interface for use by the retailer and/or other third party retailers.

The systems and methods according to this invention reduce and/or eliminate labor expenses associated with this managing of such additional transactions by the retailer which would otherwise result in a significant increase in the cost of the back office activity. The systems and methods of this invention result in no significant additional workload and, therefore, the result is limited additional cost to the retailer. Moreover, the retailer may charge the customer or the customer's bank a charge for providing any such service, thus creating additional revenue for the retailer.

In another exemplary embodiment, the customer may pay into a customer's savings or "Christmas" club at the payment media originating source and/or "back office."

Foreign Currencies

The systems and methods according to this invention also include foreign currency conversion and currency handling, e.g., in certain locations, e.g., in retail locations near foreign countries, banking centers, etc. Payment media management systems are able to maintain current foreign currency inventories with exchange rate displays showing local currency values, as well as screens to show types, denomination, numbers and total value of bills/notes in current inventory. The payment media management system can automatically feed currency conversion factors to payment media management system machines for display and use.

The systems and methods according to this invention also provide for setting aside one or more of the roll storage modules (RSMs) in a Twin Safe or other payment media storage unit for foreign currency(ies).

User Friendly Characteristics

The systems and methods according to this invention also provide user-friendly characteristics of payment media management system facilities, devices, and methods. This may include, for example, one or more touch screens mounted on a kiosk, wherein the touch screens have a number of user configurable and/or definable format schemes, looks, and mounting configurations, and are accessible from many, including all, sides of the kiosk, a calculator interface feature to enter numeric information such as, for example, payment media originating source numbers in different formats for the same payment media originating source, provision for full or truncated register numbers when depositing funds, such as, for example, "011" and/or "11", screen configuration changeability, and/or a number of device and/or screen orientations so a user may access a payment media management system machine from a number of different user orientations.

The payment media management system machines may have not only one or more locks with keys, but also, or alternatively, digital or cipher or other electronic locks on the machine that require no physical key, including on the drop safe door portions thereof. Moreover, the drop safe door of a payment media management system machine may have one or more slots for rejected notes or bills. If the machine rejects bills or notes, the rejected notes may be placed in the rejected note(s) slot. In this regard, as noted herein, an electronic keypad can be provided separately or as part of a touch screen, for example, to enter the number and value of rejected notes into the payment media management system The systems and methods according to this invention may permit withdrawals from payment media management system devices by personnel other than cashiers using established procedures, authorization levels, etc. For example, supervisors and/or managers may be allowed to issue start funds for multiple entities. The system may allow supervisors of a particular payment media management system machine and/or other management personnel to issue start funds for multiple entities without having to log in each time. Cashiers may be permitted to sign off after a funds dispense by simply using a touch screen to hit a cancel button to sign off completely without going through a more lengthy sign off procedure after pressing "log-off", for example. The payment media management system completes the logoff after the "cancel" button is touched.

The payment media management system may be used with individuals who have had little or no training in using the system. To this end, the payment media management system user interface is designed to be user friendly and simple to use. Moreover, the interface is designed so that the user spends as little time as possible at the apparatus carrying out a transaction.

A significant loss of time sometimes occurs when a user is required to make a decision. Various exemplary embodiments of the systems and methods of this invention have been configured to so that as few decisions as possible are needed to be made by a user to accomplish a funds transaction.

However there will still be instances where a user must choose between two or more events. For example, users may be asked to confirm they have finished a transaction or asked if they wish to proceed with another transaction. Such a request may cause confusion and may result in time being wasted.

The inventors have recognized that, in the majority of instances, one of two or more options will be selected and the selection of the alternative(s) is very much the exception. The systems and methods of this invention facilitate user decisions using means that highlight, and/or provide preferred choices and/or set default choices for, the most commonly selected option(s). The highlighting means may be visual, tactile or audible. The systems and methods of the invention also use smart processing to guide a user through the decision making process.

In other exemplary embodiments, the payment media management system interface is provided with a means to determine what the preferred selections are for each transaction type. This determination may be based on historical data captured from actual use of payment media management system devices. The interface may set default choices which may be installed periodically and/or during manufacture of the payment media management system device.

In other exemplary embodiments, a store may be able to define the preferred selections based on their empirical knowledge. A store may alter prescribed and/or default selections on a pre-selected periodic, or an "ad hoc" basis.

As an example, a store may wish to introduce a new step in its Start Fund process. Various exemplary embodiments of the systems and methods of this invention achieve this new step introduction with the aforementioned default setting procedure and/or with the aforementioned highlighting and/or predetermined choice guidance. Normally such a change would require retraining of staff to make them aware of the new step. However, various exemplary embodiments of this invention permit the user to be guided through the steps by the interface, e.g., by the highlighting of preferred selections. As a result, when users see a new selection they may just follow the highlighted selections and need no personalized training in using the interface.

Obviously if user does not agree with a highlighted step or has doubt about how to proceed, that user will have to make a conscious decision not to follow a highlighted or default or recommended selection.

In various exemplary embodiments of the systems and methods of the invention, a highlighted or recommended or default selection may be made from a remote location such as a head office, in a similar manner as it can be made in the store. Highlighted or recommended or default selections may also be determined based on user behavior. Typically, a user must login and, as such, is identifiable to the payment media management system. The payment media management system can therefore build up a picture of user activity and highlight those choices the user usually makes. Moreover, if the payment media management system determines that a user is selecting a non-highlighted, or not-recommended, or non-default option(s) one reason may be that users are confused by the interface.

In various exemplary embodiments, the payment media management system may notify a supervisor or other store personnel to spend some time with users and provide them some training in using the payment media management system. In other exemplary embodiments, the payment media management system interface may makes a highlighted or preferred or default selection even more obvious to the user by, for example, increasing the brightness of the color, volume of the warning, or making the highlighted selection flash on and off.

Security Measures

The systems and methods according to this invention provide audit and audit trail generation, physical security measures, and methods of dealing with payment media shortages and payment media management errors. This may include register activity exception reporting, e.g., using exception based reporting rules, printing and displaying only if exceptions exist, e.g., if there is a missing deposit, a missing start find, an overage or shortage that is out of predetermined tolerance, etc. The system also provides for back up of any data or other information in the system locally and/or at a central office or other location. Data relating to recovery from faults can also be captured and backed up. Register exception reporting rules can also be utilized.

For example, the system may print and display information only if exceptions exist such as, for example, a deposit is missing, a start fund is missing, an out of tolerance condition exists for an overage or shortage, etc. As another example, a register may normally have a shortage and clearing find, and if one is missing, or the register has been credited with two instead of one, an error is generated and displayed and/or printed.

The systems and methods according to the invention also provide methods of dealing with and/or reacting to security incidents, including robberies, alarms (including false alarms), jams, to include agendas, scripts, lockdowns, notification of authorities, supervisory notifications, etc. For example, the payment media management system may provide for changing a user password, e.g., PIN, at predetermined time intervals, say every 90 days, or at randomly selected time intervals, or upon the occurrence of a specific event, such as, for example, a robbery, or POS password change. The password changes may be initiated over the network, for example. The system may accommodate passwords which never expire, or which expire upon certain incidents or after a specified period of time, for example. The system can also be linked with a central login system of a retail store.

The systems and methods according to the invention also provide for a special robbery fund feature which can involve dispensing a special "robbery fund" on a special request. A robbery fund may provide, for example, for dispensing a few large denominations at first, then a sequence of smaller denominations and end with a few larger denominations. Robbery funds, which may include messages such as "out of cash", are designed to trick a thief into believing that the thief has taken all of the remaining payment media from a payment media management system machine. Actions may also include triggering an alarm. A security event may include, for example, any safe opening. Alarm and other security events may be communicated to management member(s) using any known reasonable communication method, including network communications, pagers, wireless telephones, email, fax, sirens, SMS (short message service), cellular phone text messages, etc. Moreover, a payment media management system device alarm may be integrated into a local alarm via the payment media management system.

The various methods and apparatuses described herein can be utilized to provide a payment media handling solution for the retail back office. These methods enable a payment media handling apparatus to provide a user friendly, intelligent and versatile interface. The apparatus also greatly increases the security, efficiency and auditability of the back office activity.

While this invention has been described in conjunction with specific embodiments outlined above, it is evident that many alternatives, modifications and variations will be apparent to those skilled in the art. Accordingly the preferred embodiments of the invention as set forth above are intended to be illustrative and not limiting. Various changes may be made without departing from the spirit and scope of the invention as defined in the following claims.

What is claimed is:

1. A method of controlling a machine that accepts payment media and that requires a user login operation, the method comprising:
   receiving the payment media in an input receptacle of the machine wherein the payment media consists of one or more of currency notes, currency coins and currency checks;
   starting processing of the payment media as soon as the payment media has been received in the input receptacle wherein the processing of the payment media comprises validating and counting the payment media;
   storing the payment media received in the input receptacle in a secure device until the user login operation is completed;
   performing the user login operation when initiated by the user, wherein the user login operation is initiated either during or after the processing of the payment media, returning the same payment media stored in the secure device to the user following an unsuccessful login operation or storing the payment media in the machine upon a determination of a successful login operation.

2. The method of claim 1, wherein the secure device comprises one or more of a roll store in the machine, an escrow device in the machine, or a secure compartment in the machine.

3. The method of claim 1, wherein the user login operation is performed at the machine, is performed from a location electronically coupled to the machine over a local communication network or is performed from a location electronically coupled to the machine over a wide area communication network.

4. The method of claim 1, wherein the machine is located in a retail store, and the user is a cashier of the retail store, a teller or an individual not skilled in the operation of payment media handling devices, wherein the retail store includes at least one of: a single store, multiple stores, at least one third party concession stand located within the single store and a plurality of stores located within a mall.

5. The method of claim 1, wherein users of the machine are employees from plural companies and the machine is located to allow access by the users.

6. The method of claim 1, wherein the processing of the payment media further includes determining a denomination of the payment media.

7. The method of claim 1, wherein the machine dispenses payment media previously received in the input receptacle and stored in the machine.

8. The method of claim 1, wherein the processing of the payment media is cancelled following a plurality of failures of the user login operation.

9. The method of claim 8, wherein, following the plurality of failures of the user login operation, the machine returns to the user the same payment media that was received into the input receptacle from the user.

10. The method of claim 1, further comprising notifying the user that the processing of the payment media has been completed upon occurrence of a successful user login operation and the completion of the processing.

11. The method of claim 10, further comprising storing the payment media in the machine upon the completion of the processing.

12. The method of claim 1, wherein the user login operation is performed using a user interface of the machine.

13. A machine-readable storage medium that provides instructions for controlling a machine that accepts payment media and that requires a user login operation, the instructions, when executed by a processor, cause the processor to perform operations comprising:

receiving the payment media in an input receptacle of the machine wherein the payment media consists of one or more of currency notes, currency coins and currency checks;

starting processing of the payment media as soon as the payment media has been received in the input receptacle wherein the processing of the payment media comprises validating and counting the payment media;

storing the payment media received in the input receptacle in a secure device until the user login operation is completed;

performing the user login operation when initiated by a user, wherein the user login operation is initiated either during or after the processing of the payment media, returning the same payment media stored in the secure device to the user following an unsuccessful login operation or storing the payment media in the machine upon a determination of a successful login operation.

14. A machine that accepts payment media and that requires a user login operation, the machine comprising:

an input receptacle into which a user of the machine places the payment media wherein the payment media consists of one or more of currency notes, currency coins and currency checks;

a user interface through which the user of the machine initiates a user login operation;

a secure device that stores the payment media placed in the input receptacle until the user login operation is completed; and a controller that:

starts processing of the payment media as soon as the payment media has been received into the input receptacle wherein the processing of the payment media comprises validating and counting the payment media performs the user login operation when initiated by the user, wherein the user login operation is initiated either during or after the processing of the payment media, returns the same payment media stored in the secure device to the user following an unsuccessful login operation or stores the payment media in the machine upon a determination of a successful login operation.

* * * * *